(12) United States Patent
Swanson et al.

(10) Patent No.: US 7,502,855 B2
(45) Date of Patent: Mar. 10, 2009

(54) WIRELESS CLASSROOM SYSTEM ALLOWING USER TO ACCESS A PARTICULAR CLASSROOM BY SELECTING CORRESPONDING NETWORK FROM A LIST OF WIRELESS NETWORKS

(75) Inventors: Mark R. Swanson, Wisconsin Rapids, WI (US); William L. Moss, Jr., Wisconsin Rapids, WI (US); Peter William Jungwirth, Wisconsin Rapids, WI (US); Dean A. Goodmanson, Port Edwards, WI (US)

(73) Assignee: Renaissance Learning, Inc., Wisconsin Rapids, WI (US)

( * ) Notice: Subject to any disclaimer, the term of this patent is extended or adjusted under 35 U.S.C. 154(b) by 450 days.

(21) Appl. No.: 11/474,906

(22) Filed: Jun. 26, 2006

(65) Prior Publication Data

US 2006/0294216 A1    Dec. 28, 2006

Related U.S. Application Data

(60) Provisional application No. 60/694,414, filed on Jun. 27, 2005, provisional application No. 60/729,428, filed on Oct. 21, 2005.

(51) Int. Cl.
*G06F 15/173* (2006.01)
(52) U.S. Cl. .................. 709/225; 709/219; 709/229
(58) Field of Classification Search .................. 709/225, 709/217, 218, 219, 227, 228, 229; 434/322, 434/350, 323; 725/61; 705/51; 455/434, 455/515, 435.2; 726/1; 715/705
See application file for complete search history.

(56) References Cited

U.S. PATENT DOCUMENTS 3,245,157 A    4/1966    Laviana (Continued)

FOREIGN PATENT DOCUMENTS

EP    0 843 432 A2    5/1998

(Continued)

OTHER PUBLICATIONS

Kanter, "An Open Service Architecture for Adaptive Personal Mobile Communication," IEEE Personal Communications, IEEE Communications Society, US, 8 (6), pp. 8-17 (Dec. 2001).

(Continued)

*Primary Examiner*—Le Luu
(74) *Attorney, Agent, or Firm*—Drinker Biddle & Reath LLP

(57) ABSTRACT

A wireless classroom response system includes multiple wireless networks, each serving a different classroom. Each network has a computer located proximate to the classroom that the wireless network serves. The computer executes a communications server and an application program, wherein the application program facilitates classroom activities. The system also includes a wireless access point located proximate to the classroom. The wireless access point is communicatively linked to the computer. The system also has a plurality of handheld units. Each handheld unit displays, to a user, a list of the networks, and receives a user input indicating which one of the wireless networks the handheld unit should connect. The handheld unit connects to the chosen wireless network, thereby becoming a node in the wireless network. It also transmits data to the application program via the wireless access point and the communications server.

20 Claims, 8 Drawing Sheets

U.S. PATENT DOCUMENTS

| | | | |
|---|---|---|---|
| 4,764,120 | A | 8/1988 | Griffin et al. |
| 5,002,491 | A | 3/1991 | Abrahamson et al. |
| 5,273,437 | A | 12/1993 | Caldwell et al. |
| 5,379,221 | A | 1/1995 | Schulter et al. |
| D377,339 | S | 1/1997 | Beruscha et al. |
| RE35,449 | E | 2/1997 | Derks |
| 5,724,357 | A | 3/1998 | Derks |
| 5,823,788 | A | 10/1998 | Lemelson et al. |
| D408,381 | S | 4/1999 | Nelson et al. |
| 6,021,119 | A | 2/2000 | Derks et al. |
| D431,562 | S | 10/2000 | Bhatia et al. |
| D437,314 | S | 2/2001 | DeLeon |
| D447,729 | S | 9/2001 | Song et al. |
| D447,740 | S | 9/2001 | Johansson |
| D448,026 | S | 9/2001 | Nicklos et al. |
| D448,375 | S | 9/2001 | Walters et al. |
| D452,863 | S | 1/2002 | Madsen et al. |
| D469,763 | S | 2/2003 | Searby |
| D480,716 | S | 10/2003 | Saikawa et al. |
| D481,037 | S | 10/2003 | Searby |
| 6,665,000 | B1 | 12/2003 | Buehler et al. |
| 6,807,395 | B2 | 10/2004 | Iwazaki et al. |
| D501,643 | S | 2/2005 | Strand et al. |
| 6,895,213 | B1 | 5/2005 | Ward |
| D523,854 | S | 6/2006 | Rinna et al. |
| 7,360,158 | B1 * | 4/2008 | Beeman ............... 715/705 |
| 2003/0073065 | A1 | 4/2003 | Riggs |
| 2003/0074320 | A1 * | 4/2003 | Riggs ............... 705/51 |
| 2003/0095102 | A1 | 5/2003 | Kraft et al. |
| 2003/0153263 | A1 | 8/2003 | Glass et al. |
| 2003/0153321 | A1 | 8/2003 | Glass et al. |
| 2003/0153347 | A1 | 8/2003 | Glass et al. |
| 2003/0236891 | A1 | 12/2003 | Glass et al. |
| 2004/0033478 | A1 | 2/2004 | Knowles et al. |
| 2004/0072136 | A1 | 4/2004 | Roschelle et al. |
| 2004/0115608 | A1 * | 6/2004 | Meyer et al. ............... 434/323 |
| 2004/0127208 | A1 | 7/2004 | Nair et al. |
| 2004/0203563 | A1 | 10/2004 | Menard |
| 2004/0205818 | A1 * | 10/2004 | Saruhashi et al. ............... 725/61 |
| 2004/0209634 | A1 * | 10/2004 | Hrastar ............... 455/515 |
| 2004/0219493 | A1 | 11/2004 | Phillips |
| 2004/0229642 | A1 | 11/2004 | Derks et al. |
| 2004/0248074 | A1 * | 12/2004 | Hoyashita et al. ............... 434/322 |
| 2005/0003338 | A1 | 1/2005 | Norcott et al. |
| 2005/0070294 | A1 | 3/2005 | Lyle et al. |
| 2005/0086261 | A1 | 4/2005 | Mammone |
| 2005/0245295 | A1 | 11/2005 | Lee et al. |
| 2005/0282535 | A1 | 12/2005 | Chmaytelli et al. |
| 2005/0287981 | A1 | 12/2005 | Hill |
| 2006/0057550 | A1 * | 3/2006 | Sahashi ............... 434/350 |
| 2006/0111103 | A1 * | 5/2006 | Jeong et al. ............... 455/434 |
| 2006/0183477 | A1 * | 8/2006 | Bocking et al. ............... 455/435.2 |
| 2006/0189311 | A1 * | 8/2006 | Cromer et al. ............... 455/434 |
| 2006/0204944 | A1 * | 9/2006 | Preskill ............... 434/322 |
| 2008/0052754 | A1 * | 2/2008 | Iga ............... 726/1 |

FOREIGN PATENT DOCUMENTS

| | | |
|---|---|---|
| EP | 0 697 773 B1 | 9/2002 |
| EP | 1 337 127 A1 | 8/2003 |
| EP | 1 351 145 A | 10/2003 |
| EP | 1 427 228 A2 | 6/2004 |
| GB | 2 375 014 A | 10/2002 |
| WO | WO 98/06210 A1 | 2/1998 |
| WO | WO 2004/031488 A1 | 4/2004 |
| WO | WO 2005/039146 A2 | 4/2005 |

OTHER PUBLICATIONS

Kopp et al., "Security Architecture for Service-Based Mobile Environments," Pervasive Computing and Communications Workshops, 2005, Percom 2005 Workshops, Third IEEE International Conference on Kauai Island, HI, USA Mar. 8-12, 2005, Piscataway, NI, USA, IEEE, pp. 199-203 (Mar. 8, 2005).

Cortez et al., "Teaching Science with Mobile Computer Supported Collaborative Learning (MCSCL)," Wireless and Mobile Technologies in Education, 2004, Proceedings. The 2nd IEEE International Workshop on Jungli, Taiwan, Mar. 23-25, 2004, Los Alamitos, CA, USA, IEEE Comput. Soc., US, pp. 67-74 (Mar. 23, 2004).

Digiano et al., "Collaboration Design Patterns: Conceptual Tools for Planning for The Wireless Classroom," Wireless and Mobile Technologies in Education, 2002, Proceedings, IEEE International Workshop on Aug. 23-29, 2002, Piscataway, NJ, USA, IEEE, pp. 39-47 (Aug. 29, 2002).

Wang, "Context Awareness and Adaptation in Mobile Learning," Wireless and Mobile Technologies in Education, 2004, Proceedings, The 2nd IEEE International Workshop on Jungli, Taiwan, Mar. 23-25, 2004, Los Alamitos, CA, USA, IEEE Comput. Soc., US, pp. 154-158 (Mar. 23, 2004).

Yatani et al., "Musex: A System for Supporting Children's Collaborative Learning in a Museum with PDAs," Wireless and Mobile Technologies in Education, 2004, Proceedings, The 2nd IEEE International Workshop on Jungli, Taiwan, Mar. 23-25, 2004, Los Alamitos, CA, USA, IEEE Comput. Soc., US, pp. 109-112 (Mar. 23, 2004).

Aymerich et al., "An automatic assessment system supporting computer science entrance examinations," Advanced Learning Technologies, 2004. Proceedings. IEEE International Conference on Joensuu, Finland Aug. 30-Sep. 1, 2004, Piscataway, NJ USA, IEEE, pp. 657-659 (Aug. 30, 2004).

Chen et al., "Task-oriented modelling of autonomous decentralised systems," Autonomous Decentralized Systems, 2000. Proceedings. 2000 International Workshop on Chengdu, China Sep. 21-23, 2000, Los Alamitos, CA, USA, IEEE Comput. Soc., US, pp. 172-179 (Sep. 21, 2000).

Cristea et al., "Intelligent E-learning environments architecture and basic tools," Information Technology Based Higher Education and Training, 2004. ITHET 2004. Proceedings of the Fifth International Conference on Istanbul, Turkey May 31-Jun. 2, 2004, Piscataway, NJ, USA, IEEE, pp. 610-615 (May 31, 2004).

Nagaraja et al., "Evaluating the impact of communication architecture on the performability of cluster-based services," High-Performance Computer Architecture, 2003. HPCA-9 2003. Proceedings. The Ninth International Symposium on Feb. 8-12, 2003, Piscataway, NJ, USA, IEEE, pp. 229-240 (Feb. 8, 2003).

Sterritt et al., "Personal autonomic computing self-healing tool," Engineering of Computer-Based Systems, 2004. Proceedings. 11th IEEE International Conference and Workshop on the Brno, Czech Republic May 24- 27, 2004, Piscataway, NJ, USA, IEEE, pp. 513-520 (May 24, 2004).

Sun et al., "Design and implementation of Java-based HTTP input channel for integrated WLAN and GPRS networks," Networks, 2004 (Icon 2004). Proceedings. 12th IEEE International Conference on Singapore Nov. 16-19, 2004, Piscataway, NJ, USA, IEEE, US, pp. 258-262 (Nov. 16, 2004).

* cited by examiner

FIG. 7

Segment #1 of Datagram 45

| 1 | 6 | 0x40 | SYN | 0xXX | 45 | 0 |
|---|---|------|-----|------|----|----|
| Bytes 0 - 95 ||||||||

Segment #2 of Datagram 45

| 1 | 6 | 0x40 |  | 0xXX | 45 | 96 |
|---|---|------|--|------|----|----|
| Bytes 96 - 191 ||||||||

Segment #3 of Datagram 45

| 1 | 6 | 0x40 | FIN | 0xXX | 45 | 192 |
|---|---|------|-----|------|----|-----|
| Bytes 192 - 199 ||||||||

WIRELESS CLASSROOM SYSTEM ALLOWING USER TO ACCESS A PARTICULAR CLASSROOM BY SELECTING CORRESPONDING NETWORK FROM A LIST OF WIRELESS NETWORKS

CROSS-REFERENCE TO RELATED APPLICATIONS

This application claims the benefit of the filing date of U.S. Provisional Application No. 60/694,414, filed Jun. 27, 2005 and U.S. Provisional Application No. 60/729,428, filed Oct. 21, 2005, each of which are incorporated herein by reference in their entirety.

FIELD OF THE INVENTION

The invention relates generally to wireless classroom response systems, and, more particularly, to wireless classroom response systems in which each student has a handheld unit that can wirelessly send messages to a computer.

BACKGROUND OF THE INVENTION

When a lesson is presented to a class of students it is often difficult to gauge whether the students are absorbing or even paying attention to the lesson. Wireless classroom response systems address this difficulty. Some currently-existing systems are deficient however, in that they do not permit the student to choose from multiple wireless networks. Others use proprietary communication schemes, thereby inhibiting the development of hardware and software by third-party vendors.

BRIEF SUMMARY OF THE INVENTION

In accordance with the foregoing, a wireless classroom response system is provided. In an embodiment of the invention, the system includes multiple wireless networks, each serving a different classroom. Each network has a computer located proximate to the classroom that the wireless network serves. The computer executes a communications server and an application program, wherein the application program facilitates classroom activities. The system also includes a wireless access point located proximate to the classroom. The wireless access point is communicatively linked to the computer. The system also has a plurality of handheld units. Each handheld unit displays, to a user, a list of the networks, and receives a user input indicating which one of the wireless networks the handheld unit should connect. The handheld unit connects to the chosen wireless network, thereby becoming a node in the wireless network. It also transmits data to the application program via the wireless access point and the communications server.

In another embodiment of the invention, the system has a computer, a wireless access point, and handheld units located proximate to a classroom. The wireless access point is communicatively linked to the computer. The computer displays a user interface that permits an instructor to interact with the computer. The computer executes a communications server. Each handheld unit is used by a student, and performs the steps of transmitting a markup language document to the computer via the wireless access point, wherein the markup language data contains data that identifies a service of the communication server.

In yet another embodiment of the invention, the system has a computer, a wireless access point, and handheld units located proximate to a classroom. The wireless access point is communicatively linked to the computer. The computer displays a user interface that permits an instructor to interact with the computer. The computer executes a communications server. Each handheld unit is used by a student, and performs the steps of transmitting a message in an open network protocol to the computer via the wireless access point, wherein the markup language data contains data that identifies a service of the communication server.

BRIEF DESCRIPTION OF THE DRAWINGS

FIG. 7 illustrates the format of datagram segments according to an embodiment of the invention.

DETAILED DESCRIPTION OF THE INVENTION

Figure 1:
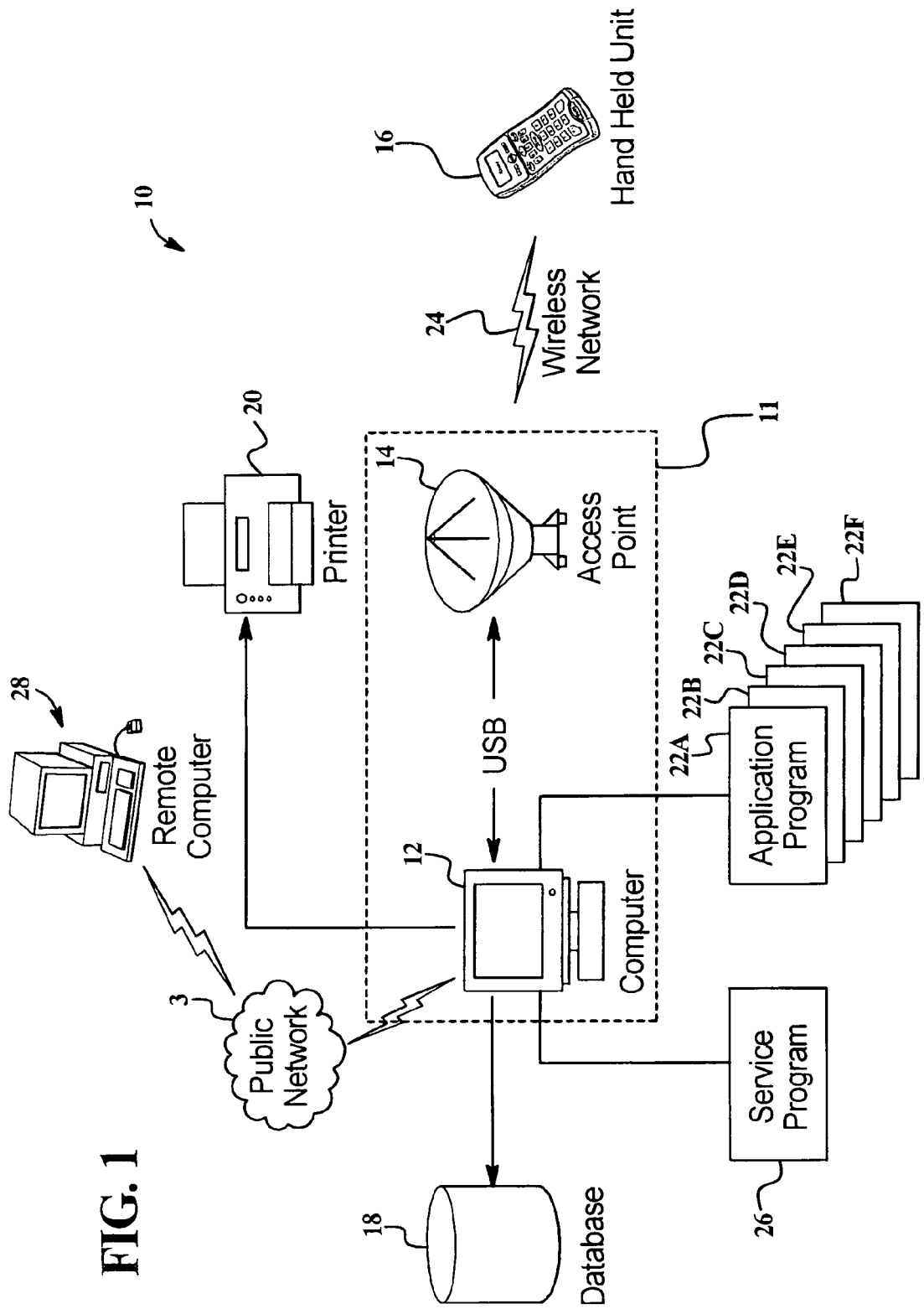
FIG. 1 illustrates a wireless audience response system according to an embodiment of the invention.

The architecture and operation of a wireless audience response system configured according to an embodiment of the invention will now be described. Referring to FIG. 1, the response system, generally labeled 10, includes base station 11 and a plurality of handheld units 16. The base station 11 includes a computer 12 and a wireless access point (AP) 14. The computer 12 is communicatively linked to the AP 14 via universal serial bus (USB), while the AP 14 is communicatively linked to the handheld units 16 via a wireless network 24. In one embodiment, the wireless network 24 is a personal area network (PAN) operating according to the IEEE 802.15.4 standard, with the AP 14 acting as a PAN coordinator. The system 10 also includes a database 18 on which data representing questions and their corresponding answers are stored. The system 10 also includes a printer 20 communicatively linked to the computer 12, which allows an instructor or other speaker to print out results of tests or surveys taken by users of the handheld units 16, first through sixth application programs 22A-22F (generically referred to as application programs 22) executing on the computer 12, which dictate how the computer 12 administers the questions transmitted to the handheld units 16 and processes the answers received in response thereto, and a service program 26, which provides communication and routing services to the application programs 22. Finally, the system 10 may be communicatively linked with a remote computer 28 via a public network (e.g., the Internet). The remote computer 28 hosts a web site from which questions may be downloaded. Also, student and class data may be stored on the remote computer 28.

Figure 2:
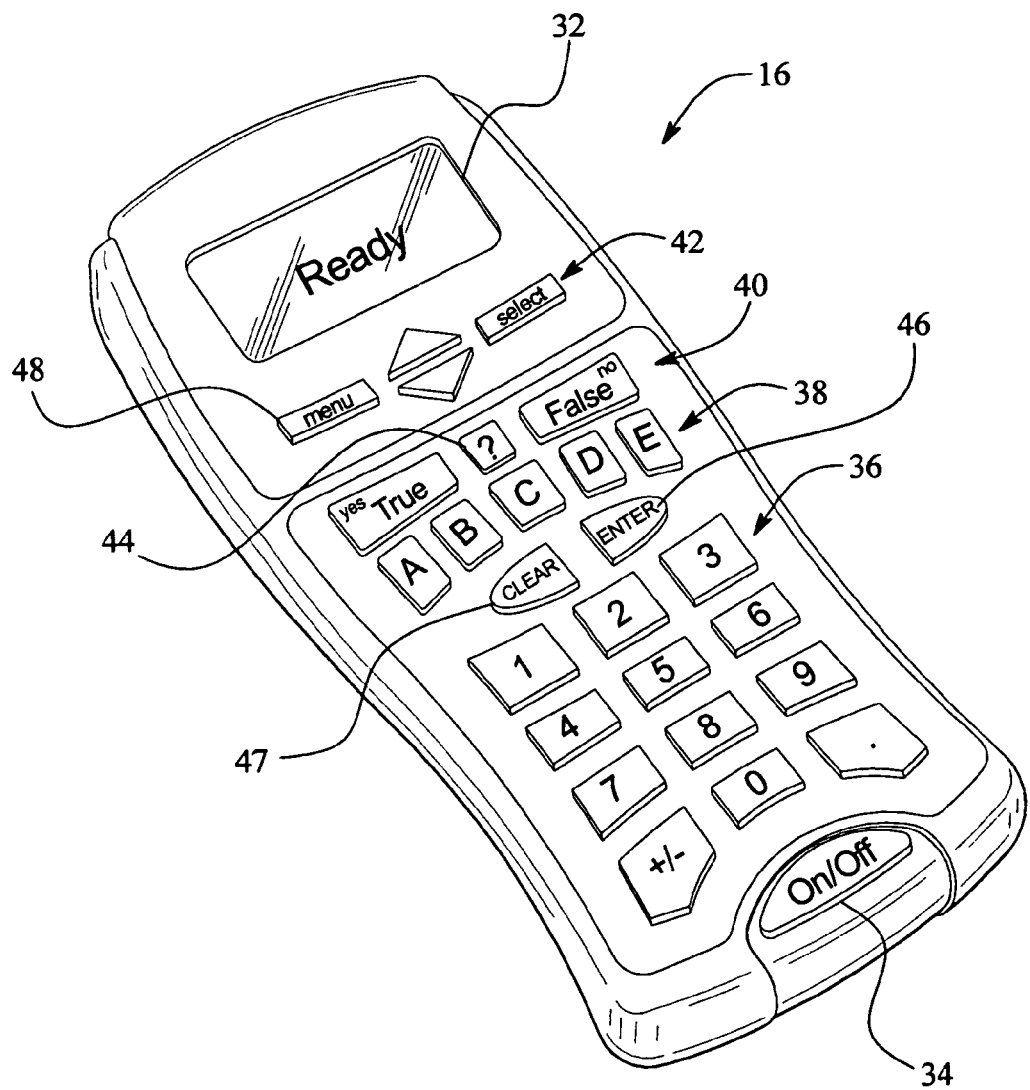
FIGS. 2 & 3 illustrate a handheld unit that may be used in an embodiment of the invention.
Figure 3:
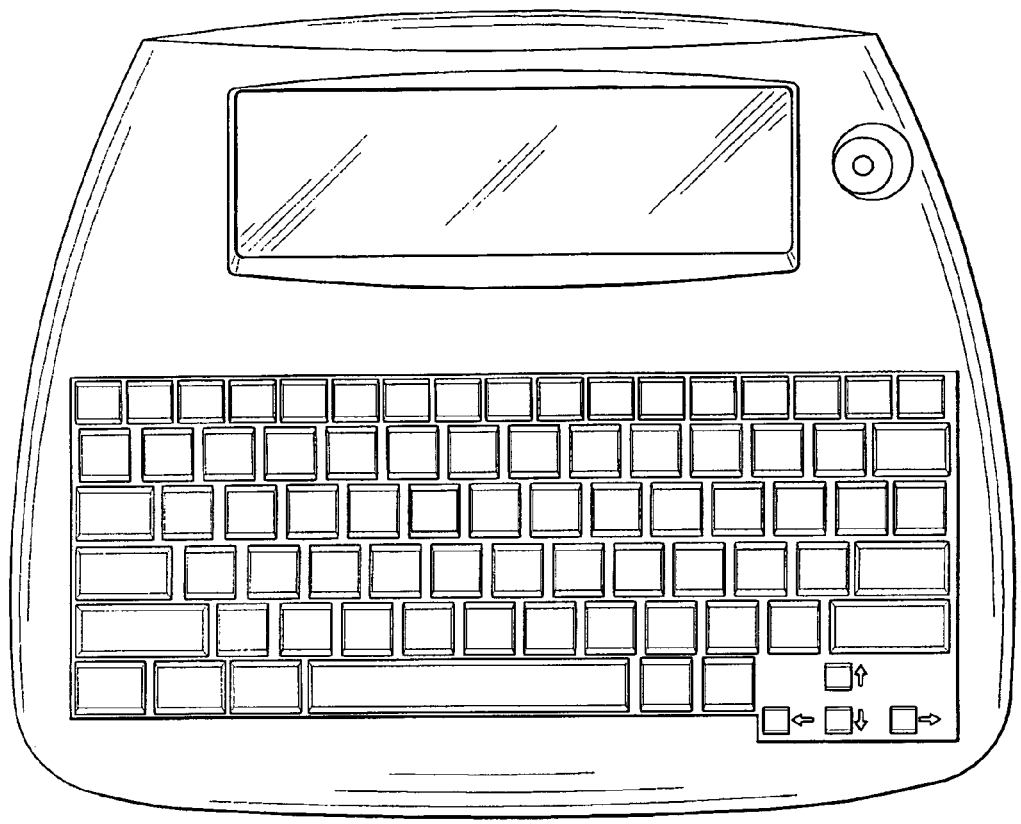
Figure 3:
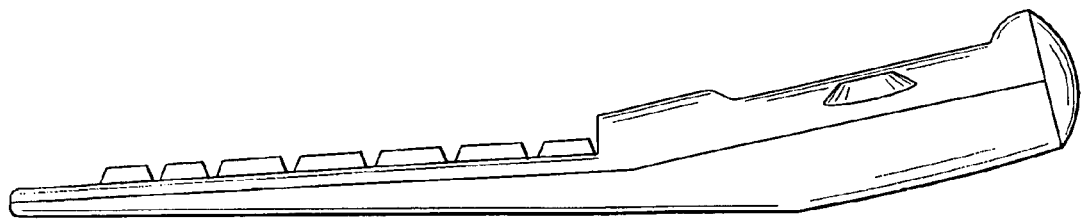

Although any of a variety of communication protocols may be used in conjunction with the system 10, according to various embodiments, the wireless networks of the system 10 communicate using an open network protocol, such as the IEEE 802.15.4 standard. When implemented using the IEEE 802.15.4 standard, the wireless networks operate as personal area networks (PANs). Furthermore, in one embodiment, each classroom in a school has its own wireless network, which includes its own PC 12 and AP 14. In this embodiment, the AP 14 is a Universal Serial Bus (USB) device that includes a microprocessor (e.g., an ARM processor) and an 802.15.4 chip set. The AP 14 carries out the functions of an 802.15.4 PAN Coordinator and also serves as the access point for devices to communicate with the wireless network. The computer 12 hosts the communications server 26 and one or more application programs. The handheld units 16 include 802.15.4 chip sets and execute programs that enable them to communicate wirelessly with the communications server 26 on the computer 12 via the AP 14. By submitting requests via the communications server 26, the handheld units 16 use services of the application programs 22 hosted on the computer 12 to obtain such things as academic content, data synchronization, real time response activities, etc. Possible embodiments of the handheld units 16 are shown in FIGS. 2 and 3. For ease of reference, the embodiment depicted in FIG. 2 will be referred to as a Type I handheld unit while the embodiment depicted in FIG. 3 will be referred to as a Type II handheld unit. In many of the mark-up language code examples contained herein, the Type I handheld unit will be also referred to by the moniker "Responder."

Figure 4:
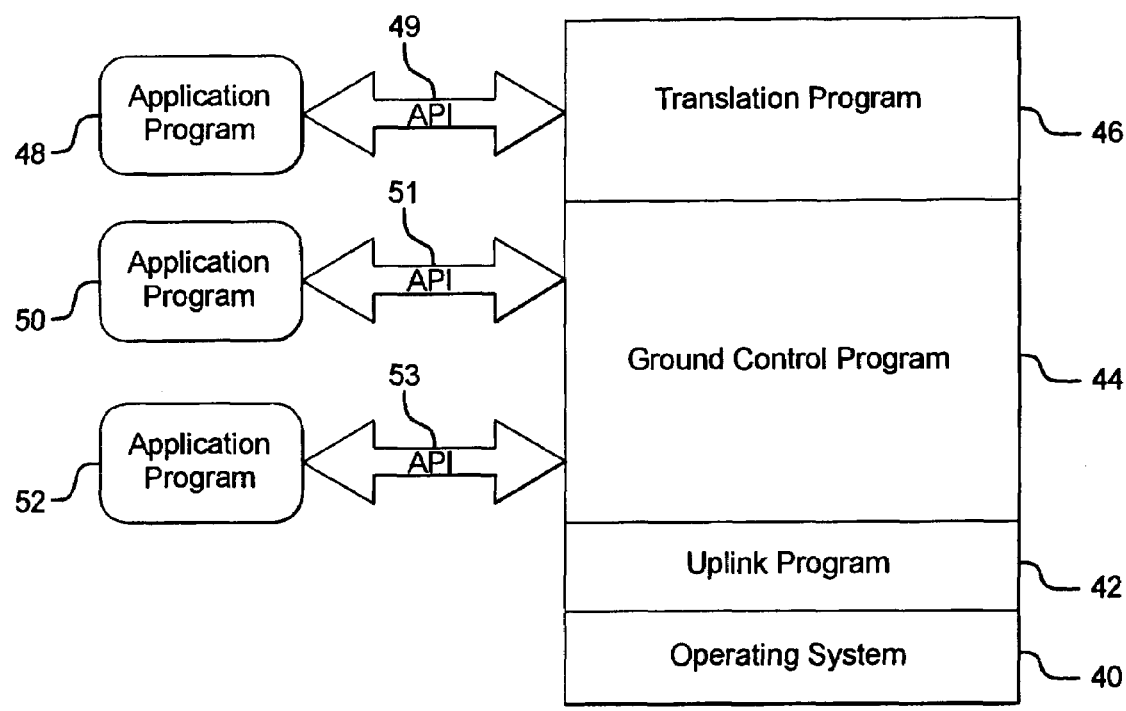
FIG. 4 illustrates a software architecture used in an embodiment of the invention.

Referring to FIG. 4, with appropriate reference to FIG. 2, software that executes on the computer 12 in an embodiment of the invention will be further described. The software includes an operating system 40, an uplink program 42, a ground control program 44, and a translation program 46. The ground control program 44, the uplink program 42, and the translation program 46 are all launched by the communications server 26 (FIG. 1). The computer 12 also hosts first, second, and third application programs 48, 50, and 52. Each of the application programs calls or can be called by the translation program 46 or the ground control program 44 via an application programming interface (API). A first API 49 facilitates interaction between the translation program 46 and the first application program 48, a second API 51 facilitates interaction between the ground control program 44 and the second application program 50, and a third API 52 facilitates communication between the ground control program 44 and the third application program 52. The application programs 48-52 send and receive data to and from the handheld units 16 via the ground control program 44. In one embodiment, the first application program 48 provides services to Type I handheld devices. The Type I handheld devices communicate using a compact markup language referred to herein the Saturn Datagram Markup Language (SDML), which the translation program 46 translates into Extensible Markup Language (XML) to provide to the first application program 48. Similarly, XML documents that the first application program 48 sends to the Type I handheld units are passed to the translation program 46, which converts them into SDML documents, which are then transmitted to the handheld units 16. The second application program 50 provides services to Type II handheld units, which communicate in XML. Thus, communication between the second application program 50 and the Type II handheld units does not need to be processed by the translation program 46.

Referring still to FIG. 4, the uplink program 42 is responsible for handling the initial USB connection and low-level communication to the AP 14. The ground control program 44 provides a communications gateway between the handheld units 16 and the application programs. The ground control program 44 also provides a USB interface to the AP 14, upper layer management services for the 801.15.4 media access control (MAC), datagram fragmentation and assembly services, and device management services. In providing device management services, the ground control program 44 executes utilities to configure and manage the handheld units 16 via a user interface (such as a Windows® or Macintosh® user interface).

In one embodiment of the invention, the computer 12 also executes a ground control manager that is separate from the ground control program 44. The ground control manager is a utility that is used to configure the AP 14, assign device ownership, inspect connected devices, and perform other management tasks. However, the application programs, working with the ground control program 44 via the appropriate API can also implement many of the management tasks normally performed by the ground control manager.

In an embodiment of the invention, the handheld units 16 connect to the PAN using the IEEE 802.15.4 Low-Rate Wireless Personal Area Network standard. The application programs running on the computer 12 connect to the wireless network via TCP/IP sockets. The ground control program 44, the USB, and the AP 14 bridge the communications between application programs 12 and the handheld units 16. The handheld units 16 locate the wireless networks using an 802.15.4 active scan. An active scan locates 802.15.4 PAN coordinators by stepping through logical channels in the 802.15.4 airspace, and issuing a beacon request. A PAN coordinator (the AP 14 in this embodiment) will respond to a beacon request with the 802.15.4 beacon frame. Within this frame is the beacon payload carrying the Network Identifier block. This block details information about the PAN as shown in the following table.

| Field | Size | Description |
|---|---|---|
| SATURN | 6 bytes | Fixed field header identifying the beacon originated from one of the wireless networks. Value is an unterminated ASCII string equal to the value "SATURN". |
| Version | 1 byte | Version: Identifies the version of the Network Identifier block. Version is two 4 bit BCDs of the form Major.Minor Current version is 0x01 |
| Flags | 1 byte | MAC OUI Filtering Enable: Bit 0. If set, the AP 14 will only accept device associations for those whose MAC OUI is equal to its own. Server Security Use: Bit 1. If set, the sever is using security. Note that Frame Control Field Security bits may not be set even though this bit is set. This situation occurs when simple atgencrypt security is used by the server. In this situation, only data requests have security and will have their Frame Control Security bits set. |
| Associated Devices | 2 bytes | Associated Devices Count: The number of active devices associated to the AP 14. |
| Network Name | 24 bytes | Network Name: Name assigned to the wireless network. Format is a null terminated ASCII string if length is less than 24 bytes. If name is 24 bytes, no termination is used. |
| Master PAN ID | 2 bytes | Master PAN ID: The ID of the PAN master for each individual PAN that is hosted by a server. Multiple PANs exist for servers that have more than one Dish connected to its USB port. |
| Master PAN Channel | 1 byte | Master PAN Channel: The channel number of the PAN master. This value along with the Master PAN ID are used to match PANs belonging to a server. |
| | 1 byte | Reserved |
| Server Version | 2 bytes | Server Version: The server major.minor version in BCD. Example: 01.12 = 0x0112 |
| Checksum | 1 byte | Checksum: A checksum computed over the block to provide a second level of identification of wireless networks. An 8-bit checksum. It is calculated by adding the block bytes together. On receipt of the beacon payload, the handheld unit 16 performs the same checksum calculation and on a mismatch, deems the beacon (e.g., the AP 14) as not belonging to a valid wireless network. |

The Network Name field is intended for use by each handheld unit 16 to help determine whether or not to associate to the wireless network. This name is set by the owner/administrator of that wireless network. When the system 10 is deployed in a classroom environment, the administrator/owner may be the instructor. The string can be displayed to the user along with other wireless networks that were found in the active scan, thereby allowing the user to make the choice of which wireless network to join. Software executing on the handheld unit 16 connects to the wireless network via the ground control program 44 (hosted on the computer 12). The ground control program 44 provides a TCP/IP port for connection. The identifier for the AP 14 is simply the localhost or IP address of the computer 12 along with the TCP port number. In one embodiment, the AP 14 port number will be selected at random from the Internet Assigned Numbers Authority (IANA) dynamic and private port range of 49152 to 65535.

In an embodiment of the invention, data transmitted between the handheld units 16 and the base station 11 is carried in 802.15.4 data frames using a delivery construct that will be referred to herein as Saturn Protocol (SP) datagrams. SP datagrams use a segment format similar to the TCP/IP segment format and have the following structure.

| Field | Size | Description |
| --- | --- | --- |
| Version | 4 bits | Version: Identifies the version of the Saturn Protocol used to generate the datagram. Current version is 0x1. |
| HL | 4 bits | Header Length: Length of the header in bytes. Value for version 0x1 header is 0x8. |
| Service Port | 1 byte | Service Port: Identifies the service port for the message. Services are provided on the host via handlers.<br>Values 0x00-0x3f are reserved by Saturn.<br>1 (0x01) = Ground Control<br>2 (0x02) = Oroshi<br>3 (0x03) = Firmware Manager<br>4 (0x04) = Server Manager<br>5 (0x05) = Owner Assignment Manager<br>Application service assignments:<br>64 (0x40) = Wasabi<br>65 (0x41) = Titan ASMT<br>66 (0x42) = Print Server |
| Flags | 1 byte | Segment Flags:<br>FIN (0x01) no more data. Indicates the final closure signal for the datagram transfer of bytes.<br>SYN (0x02) synchronize sequence number. Indicates the initial synchronizing message.<br>ACKR (0x04) acknowledgment requested. Indicates the sender is requesting acknowledgement.<br>ACK (0x10) acknowledgment. Indicates acknowledgement of the number of bytes specified in the sequence number.<br>NASS (0x20) not associated. If set by the PAN coordinator, the sending device is not associated and thus the datagram is rejected. |
| Checksum | 1 byte | Checksum: Checksum of the header bytes. |
| Datagram ID | 1 byte | Datagram Identifier: Identifies the datagram the segment belongs to. |
| Sequence Number | 24 bits | Sequence Number: Specifies the current byte sequence being sent. For a SYN segment, this number provides the starting point for sequencing the bytes to be delivered. For transfers larger than 2^24 bytes, the sequence number is wrapped back around as needed. |
| Data | Variable | Data: The datagram data. |

The ground control program 44 automatically assembles data into segments for application programs (such as the first, second, and third application programs 48, 50, and 52) that use its services. The handheld devices 16, however, provide their own services for segmentation of data.

In an embodiment of the invention, SP datagram segments are limited in size by the Maximum Transmission Units (MTU) of the 802.15.4 MAC data frame. Depending on the security suite in use for the 802.15.4 network, this MTU can be reduced due to overhead of encryption and freshness implementations. In an unsecured network, the MTU is 102 bytes. To construct a segment, a template header with the Version, Header Length, Service Port, and Datagram ID fields is created and then used to send each segment of the data in an 802.15.4 data frame. The SYN flag is set for the first segment. The FIN flag is set for the last segment. The Sequence Number for the first segment should start at 0. Remaining segments have their Sequence Number set based on the byte sequence they carry.

Figure 5:
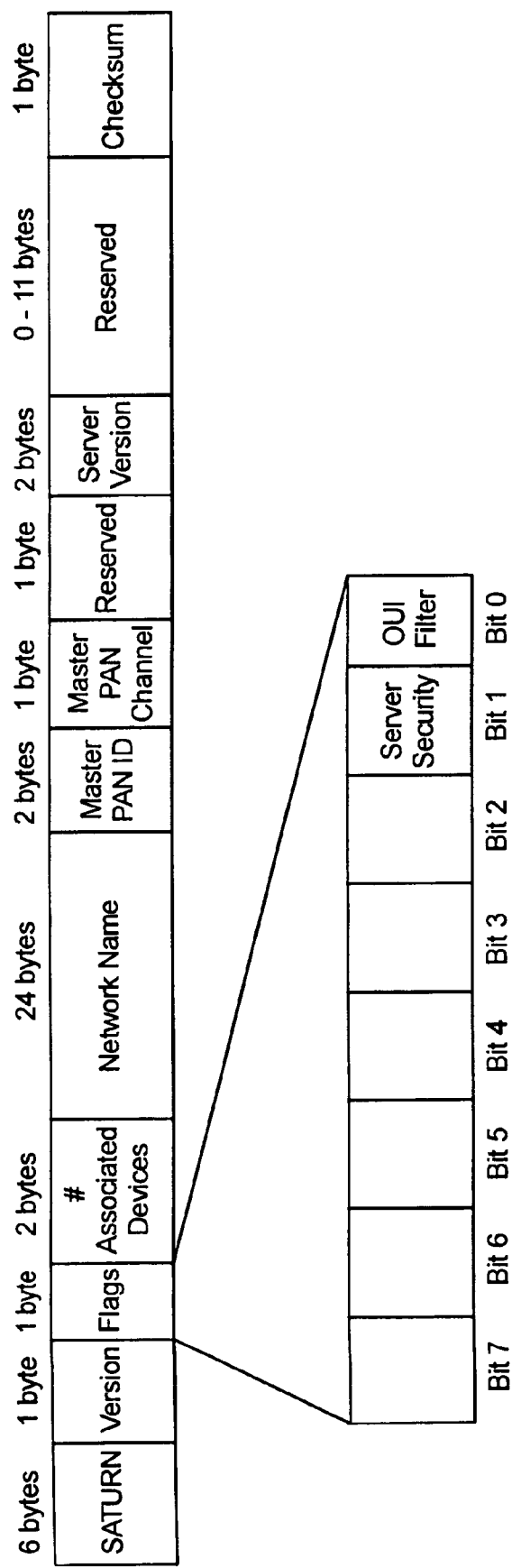
FIG. 5 illustrates the format of a network identification beacon payload according to an embodiment of the invention.
Figure 6:
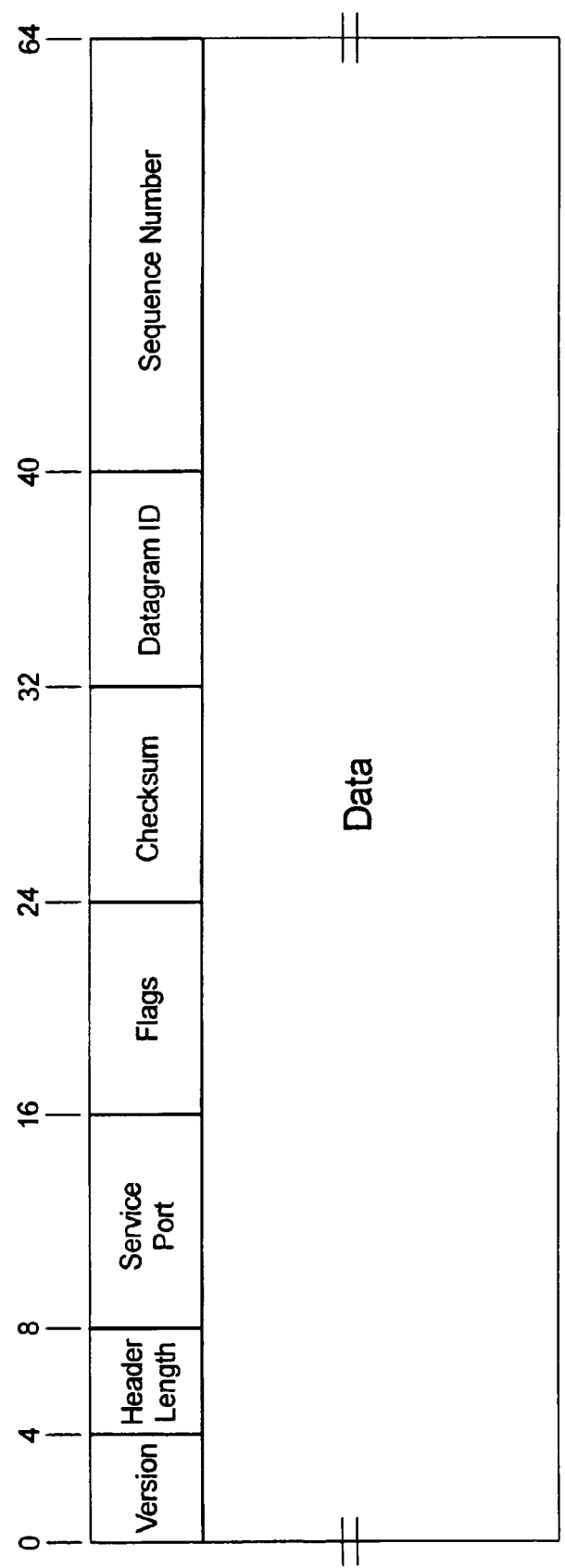
FIG. 6 illustrates the format of a datagram according to an embodiment of the invention.

Referring to FIG. 5, an example of an SP datagram is shown. In this example, it is assumed that 200 bytes of data are being sent. This package requires a total of three 802.15.4 MAC data frames (102 byte MTU) to send the entire message. When segments arrive at the computer 12, they are matched up according to the sender's 802.15.4 address from the MAC data frame, and the Service Port and Datagram ID field values in the SP datagram header.

The Datagram ID field is used to identify datagram segments during a transaction using 802.15.4 data request and data indication communication protocols. Datagram IDs are simple 8 bit IDs that are incremented each time a new transaction is started by the sender.

The Sequence Number field is used to determine the portion of the data payload the segment carries. The arrival of the datagram segment with the FIN bit equal to 1 indicates that the final segment. Reception of the FIN segment does not mean the datagram assembly is complete as it is possible previous segments may have been lost and are in the process of being resent. Determining that a datagram is completed is based on examining the sequence for missing segments.

Referring again to FIG. 4, each application program may "register" with the ground control program 44 to provide one or more services. Such registered application programs are also referred to herein as "service handlers." For an application program to act as a service handler, it expresses an API for receiving data from the handheld units 16, and an API for receiving data from handheld units 16. Each SP datagram includes a "Service" field that is used to determine the application program (service handler) that will handle processing the data payload. Example entries for this field are "Responder" to identify the application program that processes requests from Type I handheld units, "Type II" to identify the application program that processes requests from Type II handheld units and "Print Server" to identify the application that processes print request.

When SP datagrams from a handheld unit 16 are constructed and sent over the one of the wireless networks (FIG. 1), datagram segments arrive at the ground control program 44 (FIG. 4), which assembles them. After assembly of the datagram segments, the ground control program 44 extracts the payload along with the source address of the handheld unit 16 that sent the datagram. This address and the data payload are then "routed" (via the appropriate socket) to the application program that has previously registered (via a service port provided by the ground control program 44) with the ground control program 44 to handle that particular type of request. The application program then processes the request. In most cases, the processing results in the execution of business logic and the return of a response to the handheld unit 16 that initiated the communication. If no application program has registered with the ground control program 44 for a particular service, the datagrams for that service are ignored. Depending on the service, an error response may be returned to the handheld unit 16. If an application program does respond, the response is put into a datagram payload by the ground control program 44 and fragmented as needed before being routed to the handheld unit 16 for which it is intended.

As shown in FIGS. 1 and 4, there can be several application programs running at any time. For example, the application program 48 could register with ground control program 44 to handle requests for Type I handheld units, and the application program 50 could register to handle requests for Type II handheld units. Future services can also be accommodated in the ground control program 44 by simply requesting a service assignment ID from the remote computer 28 (FIG. 1).

To request services from one or more application programs according to an embodiment of the invention, a handheld unit 16 forms and transmits a "service request" to the computer 12. A service request is formed using Hypertext Transport Protocol (HTTP) POST syntax of the form:

```
POST + SPACE + resource_path + SPACE + HTTP/version + CRLF
[ request-headers + CRLF]
CRLF
[ request-body ]
```

Request Headers Include:

| Header | Description | Example |
|---|---|---|
| Device-Address | MAC address (HEX) of the requesting handheld unit. | Device-Address: 32781ae3896cb366e |
| Request-ID | Identification of request the response is intended for. Used for asynchronous requests/responses. | Request-ID: 101 |
| Content-Length | Length of the data payload. | Content-Length: 102 |

When the computer 12 receives a datagram from a handheld unit 16, the ground control program 44 identifies which application program has registered to handle the datagram, and then calls a "ReceiveData" service of that application program, as shown in the following example.

Example Ground Control Request:

```
POST /service_url/ReceiveData HTTP/1.1
Device-Address: 286d2abe8eaf274
Content-Length: 102
data
```

No response is required by the application program in this example.

If an application program wishes to send data to a handheld unit 16, the application program calls a "SendData" service of the ground control program 44, as shown in the following example.

Request

```
POST /service_url/SendData HTTP/1.1
Device-Address: 286d2abe8eaf274
Request-ID: 101
```

```
Content-Length: 102
data
```

Response
Response headers include:

| Header | Description | Example |
|---|---|---|
| Device-Address | MAC address (HEX) of the requesting handheld unit. | Device-Address: 32781ae3896cb366e |
| Request-URL | URL of request the response is intended for. | Request-URL: /ServiceHandler/68/SendData |
| Request-ID | Identification of request the response is intended for. Used for asynchronous requests/responses. | Request-ID: 101 |
| Content-Length | Length of the data payload. | Content-Length: 102 |

Example 1: Data sent successfully.
HTTP/1.1 200 OK
Request-URL: /service_url/SendData
Request-ID: 101
Content-Length: 33

```
<data><status code="200" />OK</data>
```

Example 2: Timeout sending data to device. Includes a send receipt if send was attempted.
HTTP/1.1 200 OK
Request-URL: /service_url/SendData
Request-ID: 101
Content-Length: 72

```
<data>
    <status code="306">The request expired in the device send queue</status>
    <send_receipt status="E9" bytes="512" sent="204" />
</data>
```

| Code | Description |
|---|---|
| | System Status Codes: |
| 200 | OK |
| 301 | A device with the address was not found |
| 305 | The device has disassociated from the server |
| 306 | The request expired in the device send queue |
| 500 | Internal server error |
| | HTTP Status Codes: |
| 200 | OK |
| 400 | Bad request |
| 401 | Not found |
| 408 | Request timeout |
| 500 | Internal server failure |
| 503 | Service unavailable |

In an embodiment of the invention, the ground control program 44 offers services to the application programs. These services are available through a service port defined by the ground control program 44, and allow the application programs to get and set information for the handheld units 16, configure the AP 14, and connect/disconnect to the handheld units 16. The following sections describe the structure of service requests and responses according to one embodiment of the invention.

Service Requests. Service requests are formed using standard HTTP GET and POST syntax of the form:

```
(GET) | (POST) + Space + RESOURCE_PATH + Space +
HTTPVersion + CRLF
[Headers + CRLF]
CRLF
[ message-body ]
```

Request Headers Include:

| Header | Description | Example |
|---|---|---|
| Request-ID | Identification of request to include in response. Used for asynchronous requests/responses. | Request-ID: 101 |
| Content-Length | Length of the request payload. If no request data, can be omitted. | Content-Length: 102 |

Consider the following example services URL that is used to get a list of handheld units managed by the server:
/Services/GetDevices The HTTP request might look like:
GET /Services/GetDevices HTTP/1.1
Request-ID: 101

Service Responses. Service responses are formed using HTTP syntax of the form:

```
HTTPVersion + Space + StatusCode + Space + ResponseStatus + CRLF
[ headers ] + CRLF
CRLF
[ message-body ]
```

Response Headers Include:

| Header | Description | Example |
|---|---|---|
| Request-URL | URL of request the response is intended for. | Request-URL: /Services/GetDevices |
| Request-ID | Identification of request the response is intended for. Used for asynchronous requests/responses. | Request-ID: 101 |
| Content-Length | Length of the request payload. | Content-Length: 102 |

For XML data (default content type), the message-body is enclosed in a <data> element and includes a <status> element whose contents provide the service url of the request, a status code, and optional message for the caller. This status code and message differs from the HTTP status code, which relates to the success of locating and calling the service.

Example:
HTTP/1.1 200 OK
Request-URL: /Services/SetNetworkName
Request-ID: 101
Content-Length: 62

```
<data>
    <status code="200">OK</status>
</data>
```

In the following sections, examples of application services, the format used to invoke the services, the format used to respond to the requests, and example service requests will be described.

SetNetworkSettings. This application service sets the network name and encryption settings for the AP 14 (FIG. 1).
Request
POST /Services/SetNetworkSettings HTTP/1.1

| Parameter | Validation | Value |
|---|---|---|
| Name | Not Null | Name of network. |
| encryption:enabled | Not Null | [true | false] |
| encryption:key | Not Null | Encryption key. |

Example Request:
POST /Services/SetNetworkSettings HTTP/1.1
Request-ID: 101
Content-Length: 125

```
<data>
    <network_settings>
        <name>Mrs. Jones Classroom</name>
        <encryption enabled="true" key="388aeaca12321" />
    </network_settings>
</data>
```

Response
HTTP/1.1 200 OK
Request-URL: /Services/SetNetworkSettings
Request-ID: 101
Content-Length: 33

```
<data>
    <status code="200" />
</data>
```

System Status Codes:

| Code | Description |
|---|---|
| 200 | OK |

HTTP Status Codes:

| Code | Description |
|---|---|
| 200 | OK |
| 400 | Bad request |
| 401 | Not found |
| 500 | Internal server failure |
| 503 | Service unavailable |

GetNetworkSettings. This application service gets the network settings for the AP 14.
Request
GET/Services/GetNetworkSettingg HTTP/1.1

| Parameter | Validation | Value |
|---|---|---|
| No Parameters | | |

Example Request:
GET /Services/GetNetworkSettings HTTP/1.1
Request-ID: 101
Response
HTTP/1.1 200 OK
Request-URL: /Services/GetNetworkSettings
Request-ID: 101
Content-Length: 125

```
<data>
    <status code = "200" />
    <network_settings>
        <name>Mrs. Jones Classroom</name>
        <encryption enabled="true" key="388aeaca12321" />
    </network_settings>
</data>
```

System Status Codes:

| Code | Description |
|---|---|
| 200 | OK |

HTTP Status Codes:

| Code | Description |
|---|---|
| 200 | OK |
| 400 | Bad request |
| 401 | Not found |
| 500 | Internal server failure |
| 503 | Service unavailable |

GetDevices. The GetDevices service returns a device node for each handheld unit 16 with active sessions.
Request
GET /Services/GetDevices HTTP/1.1

| Parameter | Validation | Value |
|---|---|---|
| No Parameters | | |

Example Request:
GET /Services/GetDevices HTTP/1.1
Request-ID: 101
Response
HTTP/1.1 200 OK
Request-URL: /Services/GetDevices
Request-ID: 101
Content-Length: 1023

```
<data>
    <status code="200" />
    <devices>
        <device type="wasabi" firmware_version="1.01"
        bootloader_version="1.0"
        mac_address="0015070000000000" pan_id="1234">
            <owner>
                <name>
                    <first>Wayne</first>
                    <last>Buffington</last>
                </name>
                <id>5930fca8219ea837</id>
                <pin>4390</pin>
            </owner>
            <session>
                <created>
                    <date>20050615</date>
                    <time>100332</time>
                </created >
                <last_request>
                    <date>20050615</date>
                    <time>100532</time>
                </last_request>
            </session>
            <device_settings>
                <file_settings homework_capacity="8" note_capacity="4" />
            </device_settings>
        </device>
        <device type="wasabi" firmware_version="1.01"
        bootloader_version="1.0"
        mac_address="0015070000000001" pan_id="1234">
            <owner>
                <name>
                    <first>Latka</first>
                    <last>Gravis</last>
                </name>
                <id>2489ab598cde2912</id>
                <pin>2193</pin>
            </owner>
            <session>
                <created>
                    <date>20050615</date>
                    <time>100332</time>
                </created >
                <last_request>
                    <date>20050615</date>
                    <time>100532</time>
                </last_request>
            </session >
            <device_settings>
                <file_settings homework_capacity="8"
                note_capacity="4" />
            </device_settings>
        </device>
    </devices>
</data>
```

System Status Codes:

| Code | Description |
|---|---|
| 200 | OK |

HTTP Status Codes:

| Code | Description |
|---|---|
| 200 | OK |
| 400 | Bad request |
| 401 | Not found |
| 500 | Internal server failure |
| 503 | Service unavailable |

SetDeviceEnvironmentSettings. This service specifies the environment settings for all handheld units 16.
Request
POST /Services/SetDeviceEnvironmentSettings HTTP/1.1

| Parameter | Validation | Value |
|---|---|---|
| calculator:enabled | Optional | [true \| false] to enable or disable use of calculator |

Example Request:
POST /Services/SetDeviceEnvironmentSettings HTTP/1.1
Request-ID: 101
Content-Length: 125

```
<data>
    <environment_settings>
        <calculator enabled="true" />
    </environment_settings>
</data>
```

Response
HTTP/1.1 200 OK
Request-URL: /Services/SetDeviceEnvironmentSettings
Request-ID: 101
Content-Length: 33

`<data><status code="200" /></data>`

System Status Codes:

| Code | Description |
|---|---|
| 200 | OK |

HTTP Status Codes:

| Code | Description |
|---|---|
| 200 | OK |
| 400 | Bad request |
| 401 | Not found |
| 500 | Internal server failure |
| 503 | Service unavailable |

GetDeviceEnvironmentSettings. This service specifies the environment settings for all handheld units.
Request
GET /Services/GetDeviceEnvironmentSettings HTTP/1.1.

| Parameter | Validation | Value |
|---|---|---|
| No Parameters | | |

Example Request:
GET /Services/GetDeviceEnvironmentSettings HTTP/1.1
Request-ID: 101
Response
HTTP/1.1 200 OK
Request-URL: /Services/GetDeviceEnvironmentSettings
Request-ID: 101
Content-Length: 33

```
<data>
    <status code="200" />
    <environment_settings>
        <calculator enabled="false" />
    </environment_settings>
</data>
```

System Status Codes:

| Code | Description |
|---|---|
| 200 | OK |

HTTP Status Codes:

| Code | Description |
|---|---|
| 200 | OK |
| 400 | Bad request |
| 401 | Not found |
| 500 | Internal server failure |
| 503 | Service unavailable |

SetOwnerAssignmentList. This service is called by an application program to set the owner assignment file. This file is used to respond to a request by a handheld unit 16 for owner assignment. Each owner that is assigned from this list is removed once assigned. Ownership assignment starts from the first item in the list. If an owner assignment list is already set, it will be replaced by the new list.
Request
POST /Services/SetOwnerAssignmentList HTTP/1.1

| Parameter | Validation | Value |
|---|---|---|
| Application:id | Not Null | The GUID identifying the application setting the owner assignment list. |
| Application:name | Not Null | The name of the application setting the owner assignment list. |
| file_settings:homework_capacity | Optional | Specifies number of homework files the handheld unit will support. Will be power of 2. |
| file_settings:note_capacity | Optional | Specifies number of note files the handheld unit will support. Will be power of 2. |
| owner:name | Not Null | The name of the owner |
| owner:id | Optional | The id assigned to the owner. If null, Ground Control will assign a GUID. |

-continued

| Parameter | Validation | Value |
|---|---|---|
| owner:pin | Optional | A PIN to set on the handheld unit. |
| owner:application_key | Optional | The keychain key for the application name/id pair. |

Example Request:
POST /Services/SetOwnerAssignmentList HTTP/11.1
Request-ID: 101
Content-Length: 143

```
<data>
  <owner_assignments>
    <application id="3d8920a182ef4829"name="AccelTest" />
    <device_settings>
      <file_settings homework_capacity="8" note_capacity="4" />
    </device_settings>
    <owners>
      <owner>
        <name>
          <first>Wayne</first>
          <last>Buffington</last>
        <name>
        <id>5930fca8219ea837</id>
        <pin>4390</pin>
        <application_key>101</application_key>
      </owner>
      <owner>
        <name>
          <first>Latka</first>
          <last>Gravis</last>
        </name>
        <id>2489ab598cde2912</id>
        <pin>2193</pin>
        <application_key>102</application_key>
      </owner>
    </owners>
  </owner_assignments>
</data>
```

Response
HTTP/1.1 200 OK
Request-URL: /Services/SetOwnerAssignmentList
Request-ID: 101
Content-Length: 33

```
<data>
  <status code="200" />
</data>
```

System Status Codes:

| Code | Description |
|---|---|
| 200 | OK |

HTTP Status Codes:

| Code | Description |
|---|---|
| 200 | OK |
| 400 | Bad request |

-continued

| Code | Description |
|---|---|
| 401 | Not found |
| 500 | Internal server failure |
| 503 | Service unavailable |

GetOwnerAssignmentList. This service returns the current owner assignment list.
Request
GET /Services/GetOwnerAssignmentList HTTP/1.1

| Parameter | Validation | Value |
|---|---|---|
| No Parameters | | |

Example Request:
GET /Services/GetOwnerAssignmentList HTTP/1.1
Request-ID: 101
Response
HTTP/1.1 200 OK
Request-URL: /Services/GetOwnerAssignmentList
Request-ID: 101
Content-Length: 231

```
<data>
  <status code="200" />
  <owner_assignments>
    <application id="3d8920a182ef4829"name="AccelTest" />
    <device_settings>
      <file_settings homework_capacity="8" note_capacity="4" />
    </device_settings>
    <owners>
      <owner>
        <name>
          <first>Wayne</first>
          <last>Buffington</last>
        </name>
        <id>5930fca8219ea837</id>
        <pin>4390</pin>
        <application_key>101</application_key>
      </owner>
      <owner>
        <name>
          <first>Latka</first>
          <last>Gravis</last>
        </name>
        <id>2489ab598cde2912</id>
        <pin>2193</pin>
        <application_key>102</application_key>
      </owner>
    </owners>
  </owner_assignments>
</data>
```

System Status Codes:

| Code | Description |
|---|---|
| 200 | OK |
| 512 | No owner assignment list exists |

HTTP Status Codes:

| Code | Description |
|---|---|
| 200 | OK |
| 400 | Bad request |
| 401 | Not found |
| 500 | Internal server failure |
| 503 | Service unavailable |

SetDeviceOwnerAssignment. This service is used to specify owner information for a specific handheld unit 16.
Request
POST /Services/SetDeviceOwnerAssignment HTTP/1.1

| Parameter | Validation | Value |
|---|---|---|
| application:id | Optional. Required if key is provided. | The GUID identifying the application setting the owner assignment. |
| application:name | Optional. Required if key is provided. | The name of the application setting the owner assignment list. |
| file_settings:homework_capacity | Optional | Specifies number of homework files the handheld unit will support |
| file_settings:note_capacity | Optional | Specifies number of note files the handheld unit will support |
| Owner:mac_address | Required. | The MAC address of the handheld unit in hexadecimal. |
| Owner:name | Required | The name of the owner |
| Owner:id | Optional | The id assigned to the owner. If null, Ground Control will assign a GUID. |
| Owner:pin | Optional | A PIN to set on the handheld unit. |
| Owner:application_key | Optional | The keychain key for the application name/id pair. |

Example Request:
POST /Services/SetDeviceOwnerAssigmnent HTTP/1.1
Request-ID: 101
Content-Length: 143

```
<data>
    <owner_assignment>
        <application id="3d8920a182ef4829"name="AccelTest" />
        <device_settings>
            <file_settings homework_capacity="8" note_capacity="4" />
        </device_settings>
        <owner mac_address="0015070000000000">
            </name>
                <first>Wayne</first>
                <last>Buffington</last>
            </name>
            <id>5930fca8219ea837</id>
            <pin>4390</pin>
            <application_key>101</application_key>
        </owner>
    </owner_assignment>
</data>
```

Response
HTTP/1.1 200 OK
Request-URL: /Services/SetDeviceOwnerAssignment
Request-ID: 101
Content-Length: 33

```
<data>
    <status code="200" />
</data>
```

System Status Codes:

| Code | Description |
|---|---|
| 200 | OK |
| 501 | Internal server failure |
| 301 | A device with the address was not found |
| 302 | An owner has already been assigned to the specified device |

HTTP Status Codes:

| Code | Description |
|---|---|
| 200 | OK |
| 400 | Bad request |
| 401 | Not found |
| 500 | Internal server failure |
| 503 | Service unavailable |

ConnectServiceHandler. This service requests that a particular application be designated to handle certain services for the handheld units 16. On success, the port is kept alive for these services. That application then becomes the "service handler" for that service. In the example below, the applications also register to be service handlers for particular types of devices. For example, an application may register to be the service handler for all requests originating from a Responder-type (Type I) handheld unit.
Request
POST /Services/ConnectServiceHandler HTTP/1.1

| Parameter | Validation | Value |
|---|---|---|
| :service | Not Null | 00-063 = Reserved<br>64 = Responder<br>65 = Type II<br>66 = Print Server |
| application:name | Not Null | The name of the application requesting the responder port. |
| application:id | Not Null | A guid uniquely identifying the application instance. |

Example Request:
POST /Services/ConnectServiceHandler HTTP/1.1
Request-ID: 101
Content-Length: 143

```
<data>
    <connect_handler service="64">
        <application id="3d8920a182ef4829"name="AccelTest" />
    </connect_handler>
</data>
```

Response
Example 1: Successful connection.

HTTP/1.1 200 OK
Request-URL: /Services/ConnectServiceHandler
Request-ID: 101
Content-Length: 56

```
<data>
    <status code="200" />
    <connect_handler service="64" url="/servicehandler/64/" />
</data>
```

Example 2: Existing handler.
HTTP/1.1 200 OK
Request-URL: /Services/ConnectServiceHandler
Request-ID: 101
Content-Length: 56

```
<data>
    <status code="303" />
    <connect_handler service="64">
        <application name="MathBlaster" />
    </connect_handler>
</data>
```

System Status Codes:

| Code | Description |
|---|---|
| 200 | OK |
| 303 | The handler is assigned to another application |

HTTP Status Codes:

| Code | Description |
|---|---|
| 200 | OK |
| 400 | Bad request |
| 401 | Not found |
| 500 | Internal server failure |
| 503 | Service unavailable |

DisconnectServiceHandler. This service is invoked to disconnect handheld units from a particular application program. The caller sends this request on the same port established via the ConnectServiceHandler request. If there are no more service handler connections on the port, the ground control program 44 will close the connection.
Request
POST /Services/DisconnectServiceHandler HTTP/1.1

| Parameter | Validation | Value |
|---|---|---|
| :service | Not Null | 00-063 = Reserved<br>05 = Owner Assignment Manager<br>64 = Wasabi<br>65 = Titan<br>66 = Print Server |

Example Request:
POST /Services/DisconnectServiceHandler HTTP/1.1
Request-ID: 101
Content-Length: 143

```
<data>
    <disconnect_handler service="64" />
</data>
```

Response
HTTP/1.1 200 OK
Request-URL: /Services/DisconnectServiceHandler
Request-ID: 101
Content-Length: 33

```
<data>
    <status code="200" />
</data>
```

System Status Codes:

| Code | Description |
|---|---|
| 200 | OK |
| 304 | No handler found |

HTTP Status Codes:

| Code | Description |
|---|---|
| 200 | OK |
| 400 | Bad request |
| 401 | Not found |
| 500 | Internal server failure |
| 503 | Service unavailable |

GetAccessPoints. This service returns an access point node identifier for each access point that the ground control program 44 recognizes.
Request
GET /Services/GetAccessPoints HTTP/1.1

| Parameter | Validation | Value |
|---|---|---|
| No Parameters | | |

Example Request:
GET /Services/GetAccessPoints HTTP/1.1
Request-ID: 101
Response
HTTP/1.1 200 OK
Request-URL: /Services/GetAccessPoints
Request-ID: 101
Content-Length: 1023

```
<data>
    <status code="200" />
    <access_points>
        <access_point>
            <network_settings pan_id="FA25" channel="11"
                short_address="0BE1"
```

-continued

```
    mac_address="0015070000000000" num_devices="12"/>
    <device_information firmware_version="1.12"
bootloader_version="1.04" minimum_firmware_version="1.11"
device_id="0002" vendor_id="0BD6"/>
    <state execution_mode="S" bootloader_command="01"
flash_update_status="00" app_status="02" status="Running"
stall_count="0"/>
    <history>
      <bootloader count="3" reset_time="60">
        <last_counted><date>20050914</date><time>130359</time></last_counted>
      </bootloader>
      <autofirmwareupdate count="3" reset_time="240">
        <last_counted><date>20050914</date><time>130357</time></last_counted>
      </autofirmwareupdate>
      <failures count="0" reset_time="60"/>
    </history>
  </access_point>
 </access_points>
</data>
```

System Status Codes:

| Code | Description |
|---|---|
| 200 | OK |

HTTP Status Codes:

| Code | Description |
|---|---|
| 200 | OK |
| 400 | Bad request |
| 401 | Not found |
| 500 | Internal server failure |
| 503 | Service unavailable |

AccessPointCommand. This service sends a command to a specified access point.
Request
POST /Services/AccessPointCommand HTTP/1.1

| Parameter | Validation | Value |
|---|---|---|
| access_point | Required element | |
| access_point:command | Command attribute; required | See command table below. Activatebootloader(true \| false) Reboot( ) Startfirmwareupdate (inFirmwareVersion) |
| access_point:parameter | Command parameter attribute; optional based on command | |
| access_point:mac_address | Required | MAC address of the access point handheld unit in hexadecimal. Obtained from GetAccessPoints |

| Command | Parameter | Value |
|---|---|---|
| Activatebootloader | Activate | true \| false |
| Reboot | None | |

-continued

| | | |
|---|---|---|
| Startfirmwareupdate | Firmware version to install | Major.minor format string. Example: 1.01 |
| Clearhistory | None | |

Example Request:
POST /Services/AccessPointCommand HTTP/1.1
Request-ID: 101
Content-Length: 210

```
<data>
    <access_point mac_address="0015070000000000"
        command="activatebootloader" parameter="true" />
</data>
```

Response
HTTP/1.1 200 OK
Request-URL: /Services/AccessPointCommand
Request-ID: 101
Content-Length: 1023

```
<data>
    <status code="200" />
</data>
```

System Status Codes:

| Code | Description |
|---|---|
| 200 | OK |

HTTP Status Codes:

| Code | Description |
|---|---|
| 200 | OK |
| 400 | Bad request |
| 401 | Not found |
| 500 | Internal server failure |
| 503 | Service unavailable |

SetAdminPIN. Calling this service changes the Administrator PIN for the ground control program 44.
Request
POST /Services/SetAdminPIN HTTP/1.1

| Parameter | Validation | Value |
|---|---|---|
| Pin | Pin element; required | |
| old_pin | Old PIN element; required | Must match the current Admin PIN. Encrypted using atgEncrypt |
| new_pin | New PIN element; required | Limited to characters abcde0123456789. Encrypted using atgEncrypt |

Example Request:
POST /Services/SetAdminPIN HTTP/1.1
Request-ID: 101
Content-Length: 143

```
<data>
    <old_pin>71ca809e</old_pin>
    <new_pin>39abdafe</new_pin>
</data>
```

Response
HTTP/1.1 200 OK
Request-URL: /Services/SetAdminPIN
Request-ID: 101
Content-Length: 33

```
<data><status code="200" /></data>
```

System Status Codes:

| Code | Description |
|------|-------------|
| 200  | OK |
| 401  | Unauthorized |
| 513  | Invalid PIN |

HTTP Status Codes:

| Code | Description |
|------|-------------|
| 200  | OK |
| 400  | Bad request |
| 404  | Not found |
| 500  | Internal server failure |
| 503  | Service unavailable |

ValidateAdminPIN. Calling this service validates a PIN against the Administrator PIN for the ground control program 44.
Request
POST /Services/SetAdminPIN HTTP/1.1

| Parameter | Validation | Value |
|-----------|------------|-------|
| Pin | Pin element; required | Content encrypted with atgEncrypt. |

Example Request:
POST /Services/ValidateAdminPIN HTTP/1.1
Request-ID: 101
Content-Length: 63

```
<data>
    <pin>atg encrypted pin</pin>
</data>
```

Response
HTTP/1.1 200 OK
Request-URL: /Services/ValidateAdminPIN
Request-ID: 101
Content-Length: 33

```
<data><status code="200" /></data>
```

System Status Codes:

| Code | Description |
|------|-------------|
| 200  | OK |
| 401  | Unauthorized |

HTTP Status Codes:

| Code | Description |
|------|-------------|
| 200  | OK |
| 400  | Bad request |
| 404  | Not found |
| 500  | Internal server failure |
| 503  | Service unavailable |

Shutdown Server. Calling this service shuts down the software running on the computer 12 that manages the system 10 and disconnects all access points.
Request
POST /Services/ShutdownServer HTTP/1.1

| Parameter | Validation | Value |
|-----------|------------|-------|
| Pin | Pin element; required | Administrator PIN encrypted with atgEncrypt. |

Example Request:
POST /Services/ShutdownServer HTTP/1.1
Request-ID: 101
Content-Length: 63

```
<data>
    <pin>atg encrypted pin</pin>
</data>
```

Response
HTTP/1.1 200 OK
Request-URL: /Services/ShutdownServer
Request-ID: 101
Content-Length: 33

```
<data><status code="200" /></data>
```

System Status Codes:

| Code | Description |
|------|-------------|
| 200  | OK |
| 401  | Unauthorized |

HTTP Status Codes:

| Code | Description |
| --- | --- |
| 200 | OK |
| 400 | Bad request |
| 404 | Not found |
| 500 | Internal server failure |
| 503 | Service unavailable |

In accordance with an embodiment of the invention, the handheld units 16 (FIG. 1) communicate with the computer 12 using a compact protocol. One implementation of the compact protocol will be referred to herein as Saturn Device Transport Protocol (SDTP). The handheld units 16 and the computer 12 also communicate using a compact mark-up language format. One implementation of the compact protocol will be referred to herein as the Saturn Device Mark-up Language (SDML). Messages sent between the handheld units 16 and the computer 12 are in the form of requests for services (from the handheld unit 16 to the computer 12) and responses (from the computer 12 to the handheld unit 16). Referring to FIG. 4, it is the ground control program 44 that processes such requests from handheld units. The syntax of a request is as follows:

SDTP/version+SPACE+service_resource_path+CRLF
[request-header+CRLF]
CRLF
[request-body]
Message headers for a service request include:

| Header | Description | Example |
| --- | --- | --- |
| Ri | Identification of the request that is returned in the response. Optional. | ri:100 |
| Ua | User agent. Describes the handheld unit and version. Optional. | ua:wasabi/1.0 |
| Cl | Content length. | cl:23 |

Example Request:
SDTP/1.0/aown
ri:100
ua:wasabi/1.0

Responses to service requests are returned in SDTP syntax of the form:
SDTP/version+SPACE+status_code+service_resource_
    path+SPACE+message+CRLF
[response-header+CRLF]
CRLF
[response-body]
Message headers for response include:

| Header | Description | Example |
| --- | --- | --- |
| Ru | Identifies the URL of the request the response is intended for. | ru:/asown |
| Ri | Identification of the request that response is intended for. Required when request initially specified an id. | ri:100 |
| Sv | Server. Describes the server and version fulfilling the request. Optional. | sv:AccelTest/2.4 |
| Cl | Content length. | cl:23 |

Example Response:
SDTP/1.0 200 OK
ru:/aown
ri:100
sv:AccelTest/2.4
cl:54
{own\f Wayne\l Buffington\i 38da398a173ca172\p 1234{kc\k 101{app\n AccelTest\i 3d8920a182ef4829}}}

Several examples of possible requests and responses that may be used will now be described.

AssignOwner. This service request is made by a handheld unit 16 when it wishes to have an owner assigned to it.
Request
SDTP/1.0/aown
ri:request_id
cl:content_length
{kc\k application_key(app\i application_id}}

| Parameter | Validation | Value |
| --- | --- | --- |
| Kc | Key chain element; Required if authentication is required. | Key supplied by user or device. |
| Kc\a | Optional attribute | If present, key is for administrator authentication. |
| Kc\k | Key chain key attribute; required | User or device supplied credentials for application authentication. |
| App | Application element; required | |
| app/I | Application id attribute; required | GUID of the application service handler the key is intended for. |

Response
Owner information in Saturn Device Markup Language (SDML) format.

| Parameter | Validation | Value |
| --- | --- | --- |
| Own | Required element | Owner element |
| own\n | Optional attribute | Owner fullname attribute |
| own\f | Optional attribute | Owner first name attribute |
| own\l | Optional attribute | Owner last name attribute |
| own\i | Optional attribute | Owner id; text attribute |
| own\p | Optional attribute | Owner PIN; text attribute |
| Kc | Optional element | Key chain element |
| kc\k | Required attribute | Key chain key |
| App | Required element | Application element identifying the app the keychain entry is for. |
| app\i | Required attribute | application id attribute |
| app\n | Optional attribute | application name attribute |
| Ds | Optional element | Device settings |
| Fs | Optional element | File settings |
| fs\hw | Optional attribute | Homework capacity in # of files |
| fs\no | Optional attribute | Note capacity in # of files |
| Auth | Required element | |
| auth\a | Optional attribute | If present, user is required to supply the administrator PIN. |
| auth\nk | Optional attribute | If present, the device should not store the user credentials in the key chain. |
| App | Required sub element of auth | |
| app\i | Required attribute | Application GUID |
| app\n | Optional attribute | Application Name |
| P | Optional sub element of auth | Prompt to display to user |

Example 1: Owner assigned.
SDTP/1.0 200 OK
ru:/aown
ri:request_id
cl:123

{own\f Wayne\l Buffington\i 38da398a173ca172\p 1234{kc\k 101{app\n AccelTest\i 3d8920a182ef4829}}{ds{fs\hw8\no8}}}

Example 2: Unauthorized status returned. Authentication element included in response.

SDTP/1.0 401 Unauthorized
ru:/aown
ri:request_id
cl:89
{auth{app\i 5899128ca5637be36\n AccelTest}{p\ Enter your student ID:}}

Result Codes:

| Code | Description |
|---|---|
| 200 | OK |
| 401 | Unauthorized |
| 403 | Forbidden |
| 500 | Internal server error |
| 503 | Service unavailable |
| 510 | No owner assignment |

ResetOwner. This service request asks that the owner of a handheld unit 16 be reset. The request requires an administrator PIN to be supplied by the handheld unit 16.

Request
SDTP/1.0/rown
ri:request_id

| Parameter | Validation | Value |
|---|---|---|
| Pin | Required element | Administrator PIN element. Content is atgEncrypted. |

Example:
SDTP/1.0/rown
ri:request_id
cl:11
{pin\ 1234}
Response
SDTP/1.0 200 OK
ru:/rown
ri:request_id
Result Codes:

| Code | Description |
|---|---|
| 200 | OK |
| 500 | Internal server failure |
| 503 | Service unavailable |

AssociateDevice. This service is called by a handheld unit 16 after the handheld unit 16 successfully associates with the PAN coordinator (e.g., the AP 14).

Request
SDTP/1.0/asdev
ri:request_id
Owner information in Saturn Device Markup Language (SDML) format.

| Parameter | Validation | Value |
|---|---|---|
| Di | Required element | Device info elemement |
| di\t | Required attribute | Device type: wasabi, titan, etc. |
| di\fv | Required attribute | Device firmware version |
| di\bv | Required attribute | Device bootloader version |
| di\mfv | Required attribute | Device minimum firmware version allowed by the bootloader |
| Own | Required element | Owner element |
| own\n | Optional attribute | Owner full name attribute |
| own\f | Optional attribute | Owner first name attribute |
| own\l | Optional attribute | Owner last name attribute |
| own\i | Optional attribute | Owner id; text attribute |
| own\p | Optional attribute | Owner PIN; text attribute |
| Ds | Optional element | Device settings |
| Fs | Optional element | File settings |
| fs\hw | Optional attribute | Homework capacity in # of files |
| fs\no | Optional attribute | Note capacity in # of files |

Example:
SDTP/1.0/asown
ri:request_id
cl:32
{di\t Wasabi\fv 1.01\by 1.0}{own\fWayne\l Buffington\i 38da398a173ca172\p 1234}{ds{fs\hw8\no8}}
Response
SDTP/1.0 200 OK
ru:/asown
ri:request_id
Result Codes:

| Code | Description |
|---|---|
| 200 | OK |
| 500 | Internal server failure |

Date and Time. This service gets the current date and time
Request
SDTP/1.0/date
ri:request_id

| Parameter | Validation | Value |
|---|---|---|
| No Parameters | | |

Response
Date time information in Saturn Device Markup Language (SDML) format.

| Parameter | Validation | Value |
|---|---|---|
| Dt | Required element | Date in ccyymmdd format |
| Tm | Required element | Time in hhmmss format |

Example:
SDTP/1.0 200 OK
ru:/date
ri:request_id
cl:28
{dt\ 20050823}{tm\ 093449}
Calculator. This service is a simple expression calculator.

Request
SDTP/1.0/calc
ri:request_id
cl:15

14+4*9–5%

| Parameter | Validation | Value |
|---|---|---|
| Expression content | Required | Operators supported include: +, –, *, / and % |

Response
Results of expression in Saturn Device Markup Language (SDML) format.

| Parameter | Validation | Value |
|---|---|---|
| Result content | Required | Expression result. |

Example:
SDTP/1.0 200 OK
ru:/calc
ri:request_id
cl:2
45

GetFirmwareVersions. This service returns the firmware versions on file for the specified handheld unit.
Request
SDTP/1.0/gfv
ri:request_id
cl:content_length

| Parameter | Validation | Value |
|---|---|---|
| Dev | Required element | Device information. |
| T | Device type attribute; required | Ex: wasabi, Saturn, titan. |
| Bv | Boot loader version; optional | Specifies the boot loader version that is supported by the device. |
| Fv | Minimum firmware version; optional | Specifies the minimum firmware version that is supported by the device. |

Example:
SDTP/1.0/gfv
ri:request_id
cl:15
{dev\t wasabi\bv 1.01\fv 1.02}
Response
Firmware versions in Saturn Device Markup Language (SDML) format.

| Parameter | Validation | Value |
|---|---|---|
| Fv | Required element | Firmware versions available on server |

Example:
SDTP/1.0 200 OK
ru:/gfv
ri:request_id
cl:6

{fv\ 1.0,1.1,1.2,1.3}
Result Codes:

| Code | Description |
|---|---|
| 200 | OK |
| 500 | Internal server failure |
| 516 | File not found |

StartFirmwareUpdate. This service authorizes and begins a firmware update to the handheld unit 16.
Request
SDTP/1.0/sfu
ri:request_id
cl:content_length

| Parameter | Validation | Value |
|---|---|---|
| Dev | Required element | Device classification (wasabi, titan, etc.) |
| Fv | Required element | Requested firmware version. |
| Pin | Required element | Administrator PIN |

Example:
SDTP/1.0/sfu
ri:request_id
cl:31
{dev\ wasabi}{fv\ 1.0}{pin\ 0be1}
Response
Example:
SDTP/1.0 200 OK
ru:/sfu
ri:request_id
Result Codes:

| Code | Description |
|---|---|
| 200 | OK |
| 401 | Unauthorized |
| 500 | Internal server failure |
| 516 | File not found |

Validate Administrator PIN. Validates a PIN as the Administrator PIN.
Request
SDTP/1.0/vapin
ri:request_id

| Parameter | Validation | Value |
|---|---|---|
| Pin | Required element | Administrator PIN element. Content is atgEncrypted. |

Example:
SDTP/1.0/vapin
ri:request_id
{pin\ 1234}
Response
SDTP/1.0 200 OK
ru:/rown
n:request_id
Result Codes:

| Code | Description |
| --- | --- |
| 200 | OK |
| 500 | Internal server failure |
| 503 | Service unavailable |

System Status Codes. In an embodiment of the invention, the system 10 (FIG. 1) uses status codes to enable the application programs 48-52 (FIG. 4), the ground control program 44, and the handheld units 16 to obtain status information from one another. In one implementation the ground control program 44 reserves status code values from 0 to 999, while the application programs use positive status codes starting at 1000 for their specific status codes. The following table lists examples of response status codes that may be returned by the ground control program 44.

| Code | Description |
| --- | --- |
| 200 | OK |
| 300 | |
| 301 | A device with the address was not found |
| 302 | An owner has already been assigned to the specified device |
| 303 | The handler is assigned to another application |
| 304 | No handler found |
| 305 | The device has disassociated from the server |
| 306 | The request expired in the device send queue |
| 400 | Bad request |
| 401 | Unauthorized |
| 403 | Forbidden |
| 404 | Not found |
| 405 | |
| 500 | Internal server error |
| 501 | |
| 502 | |
| 503 | Service unavailable |
| 504 | |
| 510 | No owner assignment |
| 511 | Reset disabled |
| 512 | No owner assignment list found |
| 513 | Invalid PIN |
| 514 | |
| 515 | |
| 516 | File not found |
| 517 | Disk full |
| 518 | Bad firmware |

USB Communications. In an embodiment of the invention, data transfer between the computer 12 and the AP 14 take place via a USB connection. The AP 14 is enumerated by the computer 12 as a Full Speed (12 MHz) Human Interface Device (HID) with a maximum throughput of 512 Kbits/s or 64 KBytes/s. A generic HID report capable of transporting 64 bytes is used between the AP 14 and computer 12. The AP 14 exposes three USB Endpoints: Control endpoint 0 which is 8 bytes, IN Endpoint 1 which is 64 bytes, and OUT Endpoint 2 which is 64 bytes. The sense of IN/OUT endpoints refers to the point of view of the computer 12 sending data out and receiving data in.

A datagram message can be sent to and from the AP 14 via the USB. Datagrams can be larger than the 64 bytes provided by a single HID report message. Therefore, transmission of multiple frames might be necessary to build a complete datagram.

The following table summarizes the frame format used to transport a datagram

| Frame Format for datagram transport | | |
| --- | --- | --- |
| Header 1(required) | Header 2(First Frame only) | Frame Payload. |
| 4 Bytes | (6 Bytes) | 60 or (54) Bytes |

The format of a header common to all data frames is as follows:

| Header 1 (required) | | | |
| --- | --- | --- | --- |
| Byte 0 | Byte 1 | Byte 2 | Byte 3 |
| Start of Frame Identifier UINT16: 0xA55A 0x5A | 0xA5 | Frame Type UINT8 3 | Datagram I.D. UINT8 1 |

Start of Frame Identifier: Constant 16 bit value used to identify that a given data packet is a valid computer 12 to AP 14 uplink frame. This value is fixed once and programmed into AP 14 firmware and computer 12 driver software.

Frame Type: An 8 bit value used to specify the type of frame in a datagram that could be made up of multiple frames.

| Frame Type bits | | | | | | | |
| --- | --- | --- | --- | --- | --- | --- | --- |
| B7 | b6 | b5 | b4 | b3 | b2 | b1 | b0 |
| Reserved | Reserved | Reserved | Reserved | Reserved | Reserved | LFI (Last Frame Indicator) | FFI (First Frame Indicator) |

Bit 0: First Frame Indicator (FFI): This bit indicates that this is the last frame of the datagram that may be one or more frames long.

Bit 1: Last Frame Indicator (LFI): This bit indicates that this is the first frame of the datagram that could be one or more frames long.

Bits 2-7: Reserved.

Datagram ID: An 8 bit value used to identify a set of datagram frames that all belong to specific datagram.

The specific numeric value of this field carries no meaning. This value should be unique relative to the datagram I.D. preceding and following this transaction. Any frame that has the FFI bit set will contain additional header information. This additional information will following the standard header information and precedes any payload data.

| Header 2 (optional portion) | |
|---|---|
| Datagram Payload Length | Operation Code |
| UINT32 | UINT16 |

Datagram Payload Length: Total length in bytes of the data payload being transferred. This doesn't include protocol headers or any non-payload data.

Operational Code (OpCode): This field specifies the meaning of the datagram payload and therefore what is do be done with it once is has been reassembled by the recipient.

Communication between the computer 12 and AP 14 is accomplished via datagrams as described above. The data being carried in these datagrams is described in more detail in this section. The purpose of the datagram as well as its payload is described in the tables below. The Operation Code word uniquely describes the datagram payload.

| Operation Code | |
|---|---|
| Bit 15: Direction Flag | Bits 14-0 |
| 0 = Request Message | Operation Code |
| 1 = Response Message | |

| Function | Data Direction | Operation Code |
|---|---|---|
| Custom Functions | | |
| Ping( ) | computer 12 to AP 14 | 0x0001 |
| Ping( ) response data | AP 14 to computer 12 | 0x8001 |
| Device_Initialize( ) | computer 12 to AP 14 | 0x0002 |
| Device_Initialize( ) return data | AP 14 to computer 12 | 0x8002 |
| SetLEDState( ) | computer 12 to AP 14 | 0x0003 |
| GetLEDState( ) | computer 12 to AP 14 | 0x0004 |
| GetLEDState( ) response data | AP 14 to computer 12 | 0x8004 |
| GetDeviceInformation( ) | computer 12 to AP 14 | 0x0005 |
| GetDeviceInformation( ) response data | AP 14 to computer 12 | 0x8005 |
| SetMACAddress( ) | computer 12 to AP 14 | 0x0006 |
| SetMACAddress( ) response | AP 14 to computer 12 | 0x8006 |
| PingContinuousResponse( ) | computer 12 to AP 14 | 0x0007 |
| PingContinuousResponse( ) response | AP 14 to computer 12 | 0x8007 |
| PingContinuousStop( ) | computer 12 to AP 14 | 0x0008 |
| PingContinuousStop( ) response | AP 14 to computer 12 | 0x8008 |
| DeviceShutdown( ) | computer 12 to AP 14 | 0x0009 |
| DeviceShutdown( ) response | AP 14 to computer 12 | 0x8009 |
| SetBeaconPayload( ) | computer 12 to AP 14 | 0x000A |
| SetBeaconPayload( ) response | AP 14 to computer 12 | 0x800A |
| Device_FCCTestInitialize( ) | computer 12 to AP 14 | 0x000B |
| Device_FCCTestInitialize( ) response | AP 14 to computer 12 | 0x800B |
| GetLastSignalStrength( ) | computer 12 to AP 14 | 0x000C |
| GetLastSignalStrength( ) response | computer 12 to AP 14 | 0x800C |
| Device_BootLoaderInitialize( ) | computer 12 to AP 14 | 0x800D |
| Device_BootLoaderControlMessage | Both ways | 0x000E |
| Device_AppInitialize( ) | computer 12 to AP 14 | 0x000F |
| Peek, Poke, ... | AP 14 to computer 12 | 0x800 |
| MCPS Functions | | |
| mcpsDataRequest( ) | computer 12 to AP 14 | 0x0101 |
| mcpsDataConfirm( ) | AP 14 to computer 12 | 0x0102 |
| mcpsDataIndication( ) | AP 14 to computer 12 | 0x0103 |
| McpsPurgeRequest( ) | computer 12 to AP 14 | 0x0104 |
| McpsPurgeRequest( ) return data | AP 14 to computer 12 | 0x8104 |
| MLME Functions | | |
| mlmeAssociateRequest( ) | NOT USED | 0x0201 |
| mlmeAssociateIndication( ) | AP 14 to computer 12 | 0x0202 |
| mlmeAssociateResponse( ) | computer 12 to AP 14 | 0x0203 |
| mlmeAssociateConfirm( ) | NOT USED | 0x0204 |
| mlmeBeaconNotifyIndication( ) | NOT USED | 0x0205 |
| mlmeCommStatusIndication( ) | AP 14 to computer 12 | 0x0206 |
| mlmeDisassociateRequest( ) | computer 12 to AP 14 | 0x0207 |
| mlmeDisassociateIndication( ) | AP 14 to computer 12 | 0x0208 |
| mlmeDisassociateConfirm( ) | AP 14 to computer 12 | 0x0209 |
| mlmeGetRequest( ) | computer 12 to AP 14 | 0x020A |
| mlmeGetRequest( ) return data | AP 14 to computer 12 | 0x820A |
| mlmeOrphanIndication( ) | AP 14 to computer 12 | 0x020B |
| mlmeOrphanResponse( ) | computer 12 to AP 14 | 0x020C |
| mlmePollRequest( ) | NOT USED | 0x020D |
| mlmePollConfirm( ) | NOT USED | 0x020E |
| mlmeResetRequest( ) | computer 12 to AP 14 | 0x020F |
| mlmeResetRequest( ) return data | AP 14 to computer 12 | 0x820F |
| mlmeRxEnableRequest( ) | computer 12 to AP 14 | 0x0210 |
| mlmeRxEnableConfirm( ) | AP 14 to computer 12 | 0x0211 |
| mlmeScanRequest( ) | computer 12 to AP 14 | 0x0212 |
| mlmeScanRequest( ) return data | AP 14 to computer 12 | 0x8212 |
| mlmeSetRequest( ) | computer 12 to AP 14 | 0x0213 |
| mlmeSetRequest( ) return data | AP 14 to computer 12 | 0x8213 |
| mlmeStartRequest( ) | computer 12 to AP 14 | 0x0214 |
| mlmeStartRequest( ) return data | AP 14 to computer 12 | 0x8214 |
| mlmeSyncRequest( ) | NOT USED | 0x0215 |
| mlmeSyncLossIndication( ) | NOT USED | 0x0216 |

| Function Parameters | Response Parameters |
|---|---|
| Custom Functions | |
| 0x0001: Ping( ) Parameters: | Response: |
| UINT8[ ] Payload (0 to 512 bytes, determined by Uplink) | UINT8[ ] Payload (0 to 512 bytes, same as incoming data) |
| 0x0002: Device_Initialize( ) Parameters: | Response: |
| UINT16 Short Address | UINT8 ResultCode |
| UINT16 PowerLevel | |
| UINT8 MacRxOnWhenIdle | |
| UINT8 MacAssociatePremit | |

-continued

| Function Parameters | Response Parameters |
|---|---|
| UINT16 BeaconPayloadSize<br>UINT8 Beacon Payload (43 bytes max) | |
| 0x0003: SetLEDState( ): | Response: |
| 0x0004: GetLEDState( ): | Response: |
| 0x0005: GetDeviceInformation( )<br>Parameters:<br>None | Response:<br>UINT8[6]　Firmware Version - ASCII (##.##0)<br>UINT8[6]　Hardware Version - ASCII (##.##0)<br>UINT8[8]　MAC address<br>UINT16　Device ID<br>UINT16　Vendor ID<br>UINT8　ExecutionMode<br>　('B' = bootloader 'S'=Saturn App)<br>UINT8　BootloaderCommand<br>UINT8　BootloaderLastStatus<br>UINT8[24] FirmwareTimeStamp<br>(Date:11 chars+NULL)<br>　　(Time:8 chars+NULL)<br>　　(Pad: 0,0,0) |
| 0x0006: SetMACAddress( ) Parameters:<br>UINT8[32] Serial Number Code (ASCII, 0 padded) | Response:<br>UINT8　Status (0, success) |
| 0x0007: PingContinuousResponse( )<br>Parameters:<br>UINT8[ ] Payload. Same as Ping( ) | Response:<br>UINT8[ ]　Payload. Same as Ping Response( )<br>Repeated until PingContinuousResponseStop( ), or Shutdown, or other condition |
| 0x0008: PingContinuousResponseStop( )<br>Parameters:<br>None | Response:<br>UINT8　Status 0 = Success |
| 0x0009: DeviceShutdown( )<br>Parameters:<br>None | Response<br>UINT8　Status<br>0 = Success |
| 0x000A: SetBeaconPayload( )<br>Parmaters:<br>UINT16 BeaconPayloadSize<br>UINT8 Beacon Payload (43 bytes max) | Response<br>UINT8　Status<br>0 = Success |
| 0x000B: Device__FCCTestInitialize( )<br>Parameters:<br>UINT8 Transmit, Receiver 'T', 'R', x54, x52<br>UINT8 Channel 11 - 26<br>UINT8 PowerLevel - Hex values from the following table: (Power Level : Value, 0:0, -1:x21, -3:x23, -5:x25, -7:x27, -10:x2a, -15:x2f, -25:x30 )<br>UINT8 Reserved | Response:<br>UINT8 Status<br>0 = Success<br>?? = Need Shutdown |
| 0x000C: GetLastSignalStrength( )<br>Parameters: | Response:<br>UINT8 PowerLevel - Hex values from the following table: (Power Level : Value, 0:0 , -1:x21, -3:x23, -5:x25, -7:x27, -10:x2a, -15:x2f, -25:x30 )<br>UINT8 Reserved |
| 0x000D: Device__BootLoaderInitialize( )<br>parameters:<br>UINT32 KeyCode<br>Unless Keycode is 0xA5000000, command is ignored | Response:<br>None<br>Server should reboot and enter bootloading mode |
| 0x000E: Device__BootLoaderControlMessage<br>parameters:<br>Bootloader command messages:<br>I, S, W, R, Q | |
| 0x000F: Device__AppInitialize( )<br>parameters:<br>UINT32 KeyCode<br>Unless Keycode is 0xA5000000, command is ignored | |
| 0x0010: Device__ButtonPushedDown( )<br>Parameters:<br>UINT64 Hex Address of Saturn Device | Response:<br>UINT64　MAC address |
| 0x0011 GetDeviceStatistics( )<br>Parameters: None | Response:<br>UINT32　SizeOfStatisticsStructureInByte |

-continued

| Function Parameters | Response Parameters |
|---|---|
| | UINT8[ ] Statistical data from device. Variable length |
| 0x0012 ClearDeviceStatistics( )<br>Parameters: None | |
| 0x0013 DeviceTestInterface( )<br>Parameters:<br>  UINT16    TestType<br>  UINT16    Test OpCode<br>  UINT32    PayloadSizeInBytes<br>  UINT8[ ]   Test Data[ ] -<br>            variable size | Response:<br>Parameters:<br>  UINT16    TestType<br>  UINT16    Test OpCode<br>  UINT32    PayloadSizeInBytes<br>  UINT8[ ]   Test Data[ ] -<br>            variable size |
| Poke( ) Parameters:<br>Hex Address | Response:<br>Value |
| MCPS Functions | |
| McpsDataIndication( )<br>Parameters:<br>MCPS_DATA_INDICATION<br>see mac.h<br>  mcpsDataConfirm( ) Parameters:<br>UINT8 status<br>UINT8 msduHandle<br>mcpsDataRequest( ) Parameters:<br>  UINT64    SrcAddr<br>  UINT64    DestAddr<br>  UINT16    srcPanId<br>  UINT16    destpanId<br>  UINT8     addrModes<br>  UINT8     msduLength<br>  UINT8     msduHandle;<br>  UINT8     txOptions;<br>  UINT8     pMsdu;<br>mcpsDataConfirm<br>mcpsDataIndication | |
|   McpsPurgeRequest:<br>UINT8   msduHandle | Return:<br>UINT8 Result*<br>0 = Success<br>... = MAC code #defines |
| MLME Functions | |
|   Associate Indication( ) Parameters:<br>UINT64   deviceAddress<br>UINT8    capabilityInformation<br>UINT8    securityUse<br>UINT8    aclEntry | Associate Indication( ) response:<br>UINT8 ResultCode |
| Associate Response( ) Parameters:<br>UINT64   deviceAddress<br>UINT16   assocShortAddress<br>UINT8    status<br>UINT8    securityEnable | No Reply |
| Disassociate Request( ) Parameters:<br>UINT64   DeviceAddress<br>UINT8    disassociateReason<br>UINT8    securityEnable | |
|   mlmeCommStatusIndication( )<br>Parameters:<br>UINT64   SrcAddr<br>UINT64   DstAddr<br>UINT16   panId<br>UINT8    srcAddrMode<br>UINT8    dstAddrMode<br>UINT8    status | |
|   Scan Request( ) Parameters:<br>UINT32   scanChannels<br>UINT8    scanType<br>UINT8    scanDuration | Scan Request( ) Response:<br>  UINT8 Function Return value<br>  UINT8 scanType<br>  UINT32 unscannedChannels<br>  UINT8 resultListSize<br>  union<br>    UINT8 pEnergyDetectList[16]<br>    PAN_DESCRIPTOR<br>  pPANDescriptorList[16]<br>  PAN_DESCRIPTOR format:<br>    UINT8      securityFailure<br>    UINT32    timeStamp<br>    UINT8      coordAddrMode<br>    UINT16    coordPanId<br>    UINT64    coordAddress |

-continued

| Function Parameters | Response Parameters |
|---|---|
| | UINT8 securityUse |
| | UINT16 superframeSpec |
| | UINT8 gtsPermit |
| | UINT8 linkQuality |
| | UINT8 aclEntry |
| | UINT8 logicalChannel |
| Set_Request( ) Parameters: | Set_Request( ) Response: |
| UINT8 pibAttribute | UINT8 ResultCode |
| UINT8 NumberBytesInAttribute | UINT8 pibAttribute |
| UINT8 pibAttributePayload[ ] | |
| MlmeStartRequest( ) Parameters: | mlmeStartRequest( ) Response: |
| UINT16 panId | UINT8 result |
| UINT8 logicalChannel | |
| UINT8 beaconOrder | |
| UINT8 superframeOrder | |
| UINT8 panCoordinator | |
| UINT8 batteryLifeExtension | |
| UINT8 coordRealignment | |
| UINT8 securityEnable | |
| MlmeBeaconNotifyIndication( ) | |
| Paramters: | |
| UINT8 bsn | |
| PAN_DESCRIPTOR panDescriptor | |
| UINT8 pendAddrSpec | |
| UINT8 sduLength | |
| ADDRESS pAddrList[ 7 ] | |
| UINT8 Sdu[ 52 ] | |

Custom Function Result Codes. According to one embodiment of the invention, the result codes returned by various functions include "success," "busy," and "error."

Device Statistics. The following table shows examples of device statistics that may be obtained using the GetDeviceStatistics ( ) call (described in the previous table):

| | |
|---|---|
| UINT16 | USB_SendData_TimeOuts |
| UINT16 | USB_SendReport_TimeOutWaitingForACK |
| UINT16 | USB_SendReport_TimeOutWaitingForFIFO |
| UINT16 | USB_SendStall_TimeOutWaitingForStallAckFromHost |
| UINT16 | USB_Outgoing_Message_FifoFull |
| UINT16 | USB_GetReport_BothDataBanksFull |
| UINT16 | SendButtonClosureFifoFull |
| UINT16 | CommStatusIndicationFifoFull |
| UINT16 | AssociateIndicationFifoFull |
| UINT16 | DataConfirmFifoFull |
| UINT16 | DisassociateIndicationFifoFull |
| UINT16 | DataIndicationMessageDropped |
| UINT16 | BeaconNotifyIndicationFifoFull |
| UINT16 | MessageFifoAndDataFifosOutOfSyncError |
| UINT16 | MrxPacketPoolHighWaterMark |
| UINT16 | MtxPacketPoolHighWaterMark |
| UINT16 | FifoPPacketDiscardedPacketCount |
| UINT16 | MACTimer0InterruptPriorityHighWaterMark |

Device Test Interface. According to an embodiment of the invention, the computer 12 (FIG. 1) and the AP 14 send test data to one another. The DeviceTestInterface( ) 0x0013 provides a generic message interface to send and receive test data from the computer 12 to the AP 14. The generic payload of this message type is defined below.

| Test Type | Test OpCode | PayloadSizeInBytes | Test Data[ ] |
|---|---|---|---|
| 0  1 | 2  3 | 4  5  6  7 | 8  9  10  11  ... |
| Test Type: 0x0001 | Test OpCode | Payload Size | Test data, zero or more bytes... |

The first three fields: Test Type, Test OpCode, and PayloadSizeInBytes will be part of every Device test message. The field Test Data[ ], is dependant on the specific test message and is variable in size.

Sequential Loop Back Test (Test Type 0x0001). An example of a test that can be performed via the device test interface is the "sequential loop back test." In this test, a set of messages will be sent from the computer 12 (FIG. 1) to the AP 14. Each message will contain a unique sequence number which is one greater than the sequence number of the previous message in the set. Each message will also contain a dummy payload of arbitrary data. The AP 14 will respond to each message by sending back a response that is identical to the incoming message. Additionally, the AP 14 will check the sequence number of each message to ensure that all of the messages arrive in-order and that no messages are lost. In order to allow this test to be used in a continuous fashion, as soon as any deviation from the proper sequence is detected, the AP 14 will send back a test complete message. At this point the host will stop transmission of data messages and may optionally issue a GetDeviceStatistics( ) request to see if any problems occurred during the test. It may be desireable to issue a ClearDeviceStatistics( ) request before beginning the Sequential Loop Back test.

The following table shows an example of a sequential loop back test data message.

| Sequential Loop Back Test Init Parameters | | |
|---|---|---|
| Test Type = 0x0001 | UINT16 | Define what kind of test |
| Test OpCode | UINT16 | Defines what kind of message for a given test |
| Payload Size | UINT32 | Defines the number of bytes remaining in this message |
| Starting Seq Num | UINT32 | First sequence number expected from PC in this test |
| Ending Seq Num | UINT32 | Last sequence number expected from PC in this test |

The following table shows an example of a sequential loop back test init message.

| Test Type | Test OpCode | PayloadSizeInBytes | Starting Seq Num | Ending Seq Num |
|---|---|---|---|---|
| 0 1 | 2 3 | 4 5 6 7 | 8 9 10 11 | 12 13 14 15 |
| SeqLoopBackTest: 0x0001 | SeqLoopBack INIT: 0x0001 | Payload Size: 0x00000008 | 0x00000000 | 0xFFFFFFFF |

The following table shows another example of a sequential loop back test data message.

| Sequential Loop Back Test Data Parameters | | |
|---|---|---|
| Test Type = 0x0001 | UINT16 | Define what kind of test |
| Test OpCode | UINT16 | Defines what kind of message for a given test |
| Payload Size | UINT32 | Defines the number of bytes remaining in this message |
| Sequence Number | UINT32 | Defines the sequence number of this message |
| Dummy Data[ ] | UINT8[ ] | Some dummy payload to be returned to host |

The following table shows another example of a sequential loop back test data message.

| Test Type | Test OpCode | PayloadSizeInBytes | Sequence Number | Dummy Data[0x100] |
|---|---|---|---|---|
| 0 1 | 2 3 | 4 5 6 7 | 8 9 10 11 | 12 13 14 15 ... |
| SeqLoopBackTest: 0x0001 | SeqLoopBack Data: 0x0002 | Payload Size: 0x00000104 | 0x12345678 | Dummy Data ... |

The following table shows an example of a sequential loop back test complete message.

| Sequential Loop Back Test Complete Parameters | | |
|---|---|---|
| Test Type = 0x0001 | UINT16 | Define what kind of test |
| Test OpCode | UINT16 | Defines what kind of message for a given test |
| Payload Size | UINT32 | Defines the number of bytes remaining in this message |
| Completion Code | UINT32 | Reports back success or failure of test just completed |
| Next Expected Sequence Number | UINT32 | Reports the next sequence number the Saturn was expecting |

The following table shows another example of a sequential loop back test complete message.

| Test Type | Test OpCode | PayloadSizeInBytes | Completion Code | Next Expected Seq# |
|---|---|---|---|---|
| 0 1 | 2 3 | 4 5 6 7 | 8 9 10 11 | 12 13 14 15 |
| SeqLoopBackTest: 0x0001 | SeqLoopBack INIT: 0x0003 | Payload Size: 0x00000004 | Success = 0x00000000 Failure = 0x00000001 | 0x12345678 |

Firmware Update Command Set. In one embodiment, a firmware update to a handheld unit 16 is controlled according to one or more firmware update commands, examples of which will now be described.

Identify ("I") Command. This command is sent by a handheld unit 16 to initiate a download session. If the ground control program 44 is able to service the request, it responds by sending a Write command to the unit at the first valid address contained in the image. If the ground control program 44 cannot service the request for any reason, it will send a Q command to the handheld unit 16, terminating the session.

Source: Device
Valid Responses: W, Q

| Field | Size | Description |
|---|---|---|
| Command | 1 byte | Command ID: ASCII "I" |
| Length | 1 byte | Length: Number of bytes in the packet |
| Bootload version | 2 bytes | Bootloader Version: BCD ($0101 for version 1.01) |
| Minimum FW version | 2 bytes | Minimum Compatible Firmware Version: BCD representation of the minimum firmware version that is compatible with this bootloader. Any version at a lower revision level must not be sent to the device. |
| Requested FW version | 2 bytes | Firmware Version to Download: BCD representation of the version of firmware that the device is requesting. If this field is $0000 or if the version that the device wants is not present, the ground control program 44 will ignore this and provide the latest version. |
| Address Size | 1 byte | Address size: The number of bytes in the device's address space. |
| Page size | 2 bytes | Page size: Number of bytes to be sent for each read and write operation. Also defines alignment of information (see read and write commands). |
| Name length | 1 byte | Name length: Contains the length of the name string. |
| Device Name | Variable | Device Name: String describing device. |
| Segment | 1 byte | Segment Definition: ASCII 'S' Defines the start of a valid segment in the device's address space. |
| Segment start | Address Size | <Optional> Segment start: Defines the start address of the segment |
| Segment end | Address Size | <Optional>Segment end: Defines the end of the segment (i.e. the last valid address in the segment). |

Example

| Cmd | Len | Boot Ver | Min FW | Req. FW | Addr size | Page size | Name len | Device Name | Seg | Seg start | Seg end | Seg | Seg start | Seg end |
|---|---|---|---|---|---|---|---|---|---|---|---|---|---|---|
| "I" | $18 | $0100 | $0102 | $0105 | $02 | $0040 | 6 | "Wasabi" | "S" | $1080 | $17FF | "S" | $182C | $EFFF |
| 1 | 1 | 2 | 2 | 2 | 1 | 2 | 1 | 6 | 1 | 2 | 2 | 1 | 2 | 2 |

In the above example:

Device=Wasabi

Bootloader version=1.00

Minimum compatible firmware version=1.02

Firmware version requested=1.05

The device's address space is 2 bytes wide ($0000-$FFFF)

The device takes 64 byte pages of information on reads and writes

The device has two segments: $1080-$17FF and $182C-$EFFF

Read ("R") Command. This command is sent by the handheld unit 16 in order to initiate a read operation. The ground control program 44 responds with either a W if more data is available or a Q if there is no more data to write.

Source: Device
Valid Responses: W,Q

Upon reception of the "R" command, the ground control program 44 will determine if there is valid image data at the requested address. If there is no image data at the requested address, the ground control program 44 will respond with a "W" command at the next address containing data. If there is no more data to be sent, the ground control program 44 will send a "Q" command.

| Field | Size | Description |
|---|---|---|
| Read Address | 1 byte Address size | Command ID: ASCII "R" Address: The address to be read |

Example:

| Command | Address |
|---|---|
| "R" | $1080 |
| 1 | 2 |

In this example:

The device is requesting the data contained at address $1080.

Write ("W") Command. This command is sent by the host in response to either a valid I command or in response to a R command. If sent in response to the "I" command, the address shall be the first valid address in the image file. If sent in response to the R command, the address shall be that contained in the R command. If there is no image data at the address requested in the R command, the W command shall contain the image data at the next valid address. The host shall send data until either <Page Size> number of bytes has been sent or a page boundary is reached. If the end of contiguous image data is found before a page boundary, the host shall pad the remaining bytes with 0xFF.

Source: Host
Valid Responses: R,Q

| Field | Size | Description |
|---|---|---|
| Write Address | 1 byte Address size | Command ID: ASCII "W" Address: The address to be read |
| Data | Page size | Data: Raw binary data to be written. This packet contains <Page size> items, each of <Word size>. |

Example:

| Source | Command | Address | Data | Notes |
|---|---|---|---|---|
| Device | "R" | $1080 | | Request for data at address $1080 |
| Host | "W" | $1080 | $0CA030A10923D99 EFE1BFE8CCD199F 65004C260795E606 AA01200D9EFE1BF 6E368260D95E606A A02E7066C1B26026 C1A9EFE1BF6AF01 9EFF1BA178226BA 1648B | Data contained in image file at addresses $1080-$10BF |
| # of bytes | 1 | 2 | 64 | Note |
| Device | "R" | $10BC | | Request for data at address $10BC |
| Host | "W" | $10BC | $6BA1648B | Data contained in image file at addresses $10BC-$10BF |
| # of bytes | 1 | 2 | 4 | |

Quit Bootloader ("Q") Command. This command may be sent by either device at any time to terminate a bootload session. If the command is host-initiated, the device will confirm by echoing the 'Q'.
 Source: Device/Host
 Valid Responses: Q

| Field | Size | Description |
|---|---|---|
| Quit | 1 byte | Command ID: ASCII "Q" |
| Sequence ID | 2 bytes | Sequence ID: Unique two byte packet identifier that can be used to identify response packets. Sequence ID will roll at 0xFFFF back to zero. |
| Status | 2 bytes | Status: Implementation-specific status field denoting the status of the firmware update. |
| Message Length | 1 byte | Length: Length of the message string that follows |
| Message | Variable | Message: Implementation-specific message describing the status of the firmware update. |

Example:

| Cmd | Sequence ID | Status | Message Len | Message |
|---|---|---|---|---|
| "Q" | $1234 | $00C8 | $02 | "OK" |
| 1 | 2 | 2 | 1 | 2 |

Start Bootload:
Source: Host
Valid Responses: 'I'
This command is sent by the computer 12 to synchronize communication and start the download process.

| Field | Size | Description |
|---|---|---|
| Start | 1 byte | Command ID: ASCII "S" |

Example:

| Cmd | Sequence ID |
|---|---|
| "S" | $1234 |
| 1 | 2 |

An example of how a firmware update of the handheld unit 16 might occur in an embodiment of the invention will now be described. In this example, it will be assumed that no errors are encountered during the update process.

1. Wayne connects to a PAN at the beginning of Math class.
 2. Wayne's math teacher, Mr. Kenobi informs him that he needs to update his device.
 3. Mr. Kenobi gives Wayne a pin (0351) that will allow him to start the firmware update.
 4. Wayne goes to the Settings menu on his handheld unit 16 and chooses Firmware update.
 5. The handheld unit 16 prompts for the PIN.
 6. Wayne enters the PIN and hits <ENTER>.
 7. The handheld unit 16 invokes the Start Firmware Update service with the appropriate PIN.
 8. The ground control program 44 validates the PIN and responds with the latest firmware version —OR-<a list of available firmware versions>.
 9. Wayne chooses a version.
 10. The handheld unit 16 sends the firmware version to the ground control program 44.
 11. The ground control program 44 queues up and validates firmware file and sends positive acknowledgement
 12. The handheld unit 16 saves its current network credentials (PANID, channel, etc.), as well as the firmware version to be downloaded.
 13. The handheld unit 16 sets its internal state to Boot mode and reboots.
 14. The handheld unit 16 displays a simple "loading" message.
 15. The handheld unit 16 re-associates with the AP 14.
 16. The handheld unit 16 sends the following 'I' command on the bootloader port
 17. The ground control program 44 sends 'W' with the first address
 18. The handheld unit 16 continues to send 'R'.
 19. The ground control program 44 responds with 'Q' when all image data has been sent.
 20. The handheld unit 16 internally validates version and responds with 'Q'
 21. The ground control program 44 terminates bootload session.
 22. The handheld unit 16 reboots into normal operating mode and reassociates with the ground control program 44.

Figure 8:
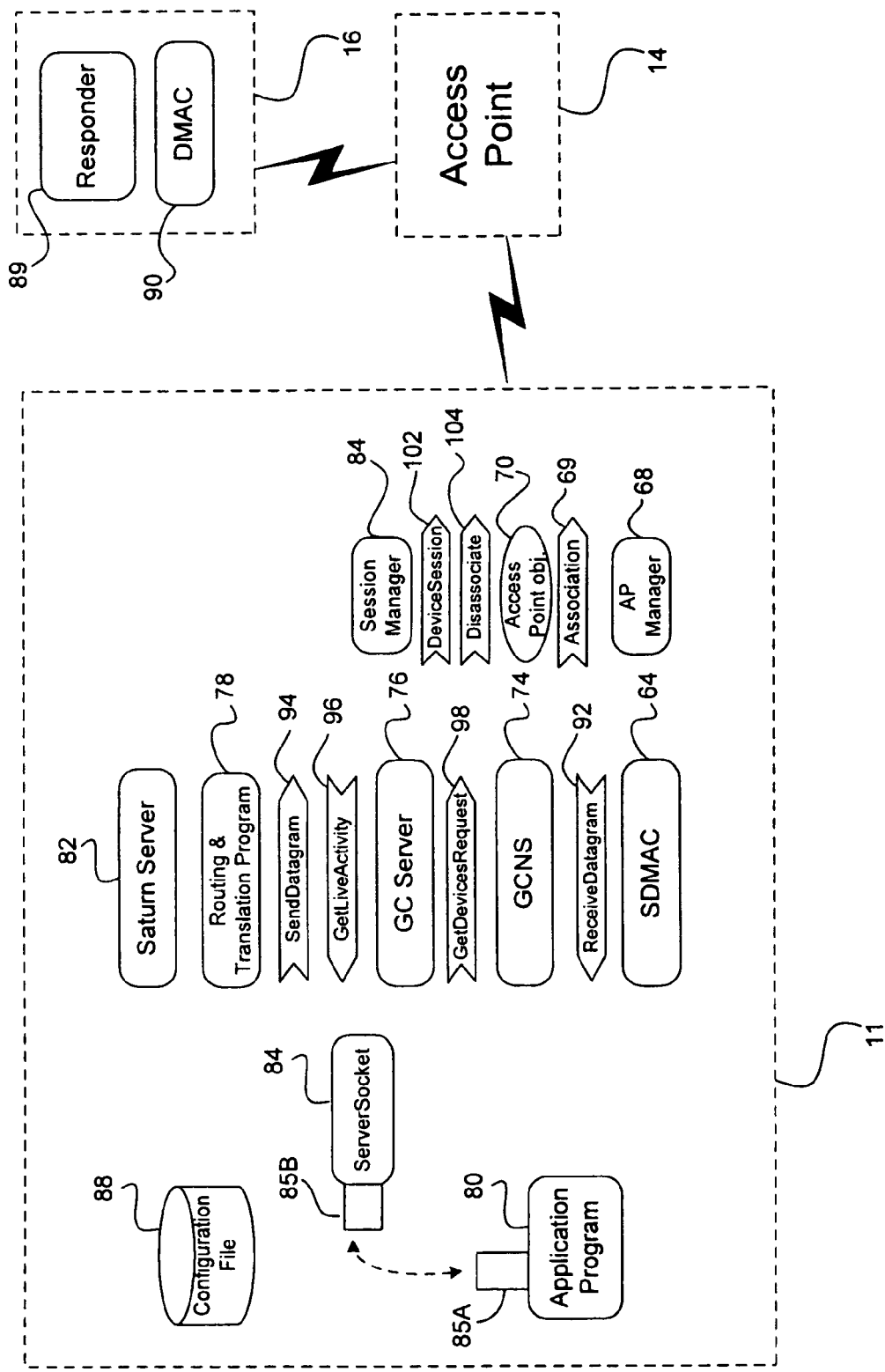
FIG. 8 illustrates a software architecture used in an embodiment of the invention.

Now that embodiments of the hardware and software architecture for the system 10 (FIG. 1) as well as various communication constructs used therein have been described, a series of usage scenarios will now be described. To aid in this description, a series of software modules that are deployed on the base station 11 and on each of the handheld units 16 is illustrated in FIG. 8. The functionality of many of these modules is described in the following table:

| Module | Description |
| --- | --- |
| Responder 89 | Device upper layer logic, business logic. This module is the firmware that manages the MAC layer of the handheld unit 16. |
| Device MAC (DMAC) 90 | MAC communication layer in the handheld unit 16. This module communicates with the AP 14 (FIG. 1). |
| Saturn Dish MAC (SDMAC) 64 | MAC communication layer in the AP 14. The AP 14 contains the MAC and necessary PAN coordinator business logic. |
| Access Point Manager (APM) 68 | Object handling the management tasks for all Access Point objects. |
| Access Point (AP) object 70 | Object handling the management of an access point (such as the AP 14 of FIG. 1) |
| Ground Control Network Service (GCNS) 74 | Datagram assembly, fragmentation and delivery, MAC upper layer management (network starting, association requests, orphaning..) This is the callback destination from the USB layer. |
| Ground Control Server (GC) 76 | Session management, application datagram routing, datagram creation for delivery. |
| Routing & Translation Program 78 | Application registered with Ground Control to handle data and submit control requests. Converts Saturn device markup language (SDML) to application-friendly XML |
| Application Program 80 | Objects or classroom application(s) that handle processing service requests. |
| Saturn Server 82 | The high-level application entity normally associated to the running software proper. |

Saturn Server startup. This use case describes the communications the startup process for the Saturn Server 82. It involves starting all network access points, network services, the GCNS 74, and the Routing & Translation Program 78.

Use Case Begins.
1. The Saturn Server 82 launches.
2. The Saturn server 82 instantiates a Session Manager 84.
3. The Saturn server 82 instantiates the Ground Control Net Services (GCNS) 74.
4. The Saturn server 82 requests the GCNS 74 to "Start Networks."
5. The networks are started.
6. The Saturn server 82 instantiates the Ground Control server (GC) 76.
7. The Saturn server 82 registers the GC 76 with the GCNS 74 as the handler for the services provided by the GC 76.
8. The Saturn server 82 instantiates a ServerSocket object 84 to handle service requests from applications.
9. The ServerSocket object 84 selects available IP port randomly from IANA dynamic/private port numbers.
10. The ServerSocket object 84 writes chosen port to a configuration file 88 (or to the registry).
11. The Saturn Server 82 instantiates an Access Point Manager (APM) 68.
12. The APM 68 begins searching for connected receivers.
13. The ServerSocket object 84 begins listening for service requests.
14. The Saturn Server 82 is running.
Use Case Ends.

Access Point Startup. This use case describes the Access Point startup process.
Use Case Begins.
1. The Access Point Manager (APM) 68 schedules a task to find connected receivers on the USB.
2. The task locates a connected receiver (the AP 14 in this example).
3. The APM 68 creates an Access Point object 70 to drive the AP 14.
4. The Access Point object 70 posts an Initialize request to the Saturn Dish MAC (SDMAC) 64.
5. The Access Point object 70 posts an ActiveScan request to the SDMAC 64.
6. The SDMAC 64 performs Active Scan.
7. The SDMAC 64 posts the Active Scan response to the Access Point object 70.
8. The AP 14 returns Active Scan results to Access Point object 70.
9. The Access Point object 70 reviews the results of the scan and selects a random PAN ID for the network. The PAN ID will be chosen at random but will be unique from those found during the Active Scan.
10. The Access Point object 70 reviews the results of the scan and selects a clear channel for the network.
11. The Access Point object 70 constructs Network Identifier Block for the receiver beacon.
12. The Access Point object 70 posts a SetBeaconPayload request to the SDMAC 64.
13. The Access Point object 70 posts a StartNetwork request to the SDMAC 64.
14. The 802.15.4 network is active.
15. The Access Point object 70 is running.
Use Case Ends.

Device Association. This use case describes the process for a handheld unit 16 to request and be granted association to the wireless network (FIG. 1).
Use Case Begins.
1. The user powers on the handheld unit 16.
2. The Responder 89 requests that the Device MAC (DMAC) 90 perform an Active Scan.
3. The DMAC 90 transmits Beacon requests on channels in the scan.
4. The Saturn Dish MAC (SDMAC) 64 receives a Beacon request from the handheld unit 16.
5. The SDMAC 64 transmits the Beacon.
6. The DMAC 90 posts the Active Scan results to the Responder 89.
7. The Responder 89 selects a PAN to associate to.
8. The Responder 89 posts an Association request to the DMAC 90.
9. The DMAC 90 transmits the Association request to the PAN coordinator.

10. The SDMAC 64 receives the Association request.
11. The SDMAC 64 posts the Association indication to the Access Point object 70.
12. The Access Point object 70 processes the Association indication from the SDMAC 64.
13. The Access Point object 70 instantiates an Association object 69 and posts it to the GCNS 74.
14. The GCNS 74 processes the Association object 69.
15. The GCNS 74 determines if the handheld unit 16 can associate to the AP 14.
16. The GCNS 74 authorizes the association.
17. The GCNS 74 posts an Association response to the Access Point object 70. The response includes the short address assigned to the handheld unit 16. The AP 14 will provide this, as it knows of all the devices sessions associated to its PAN.
18. The Access Point object 70 processes the Association response.
19. The Access Point object 70 posts the Association response to SDMAC 64.
20. The SDMAC 64 transmits the Association response to the handheld unit 16.
21. The SDMAC 64 posts the COMM Status response to the Access Point object 70.
22. The Access Point object 70 process the COMM Status response.
23. The Access Point object 70 locates an Association task object 69 associated with the COMM Status.
24. The Access Point object 70 posts the COMM Status response to the Association task object 69.
25. Association object 69 inspects the COMM Status result to determine the success of the send.
26. The Association object 69 requests that the Session Manager 84 start a session for the newly associated device.
27. The Session Manager 84 creates a DeviceSession object 102 and adds it to its list of known devices operating in the network.
28. The Association object 69 determines that the process is complete and terminates itself.
29. The DMAC 90 receives the Association response from the PAN coordinator.
30. The DMAC 90 posts the Association response to the Responder 90.
Use Case Ends.

Device Disassociation. This use case describes the process for a handheld unit 16 to disassociate from a wireless network.
Use Case Begins.
1. The user presses button to power off handheld unit 16.
2. The Responder 89 requests the Device MAC (DMAC) 90 to disassociate it from the PAN.
3. The DMAC 90 transmits a Disassociate request to the PAN coordinator.
4. The Saturn Dish MAC (SDMAC) 64 receives the Disassociate request from handheld unit 16.
5. The SDMAC 64 posts a Disassociate request to the Access Point object 70.
6. The Access Point object 70 processes the Disassociate request from SDMAC 64.
7. The Access Point object 70 posts the Disassociate request to GCNS 74.
8. The GCNS 74 instantiates a Disassociate object 104 to handle request.
9. The Disassociate object 104 requests that the Session Manager 84 disassociate the handheld unit 16.
10. The Session Manager 84 terminates a DeviceSession object 102 that is currently supporting the handheld unit 16.
11. The Disassociate object 70 posts a Disassociate response to SDMAC 64.
12. The SDMAC 64 sends a Disassociate response to the DMAC 90.
13. The DMAC 90 posts Disassociate response to Responder.
Use Case Ends.

Coordinator Disassociation. This use case describes the process for a coordinator to disassociate a device from the PAN.
Use Case Begins.
1. The Session Manager 84 instantiates the Disassociate object 104.
2. The Disassociate object 104 posts a Disassociate request to the Access Point object 70 driving with the AP 14 that the handheld unit 16 is connected to.
3. The Access Point object 70 processes the Disassociate request.
4. The Access Point object 70 posts the Disassociate request to the SDMAC 64.
5. The SDMAC 64 transmits the Disassociate request to the handheld device 16.
6. The DMAC 90 receives the Disassociate request.
7. The DMAC 90 posts the Disassociate request to the Responder 89.
8. The SDMAC 64 posts a Disassociate confirmation to the Access Point object 70.
9. The Access Point object 70 processes the Disassociate confirmation received from the SDMAC 64.
10. The Access Point object 70 posts the Disassociate confirmation to the Disassociate object 104.
11. The Disassociate object 104 processes the Disassociate confirmation.
12. The Disassociate object 104 requests that the Session Manager 84 terminate the DeviceSession object 102 associated with the disassociated handheld unit 16.
13. The Session Manager 84 terminates the DeviceSession object 102.
Use Case Ends.

In the event the confirmation returns something other than SUCCESS, the request may be retried. Eventually, the request will be timed out. On timeout, the handheld unit 16 is still considered to be disassociated.

Ground Control Service Request. This use case describes a sample GC service request for the GetDevices API.
Use Case Begins.
1. An application program 80 reads the address of a port from the global configuration file 88.
2. The application program 80 creates a TCP/IP socket connection 85A to the Saturn Server 82 using the port number from the configuration file 88.
3. The application program 80 issues a GetDevices request to the GC 76.
4. The ServerSocket object 84 creates a new socket connection 85 for the request.
5. The ServerSocket object 84 connects to the application program 80 via the socket connection 85B.
6. The ServerSocket object 84 fires a DataAvailable event.
7. The ServerSocket object 84 requests that the GC 76 handle the request.
8. The GC 76 inspects the requests for validity.
9. The GC 76 extracts the URL of the service.
10. The GC 76 determines the URL is valid.

11. The GC 76 determines the service to invoke.
12. The GC 76 creates a GetDevicesRequest command.
13. The GC 76 executes the command.
14. Pursuant to the GetDevicesRequest, the GC 76 requests list of device sessions from GCNS 74.
15. The GCNS 74 provides the list to the GC 76.
16. The GC 76 creates a response XML document.
17. The GC 76 submits response XML document to the ServerSocket object 84.
18. The ServerSocket object 84 sends the response to the application program 80 via the socket connection 85B.
19. The ServerSocket object 84 disconnects from the application program 80.
20. The ServerSocket object 84 deletes the socket 85B.
21. The application program 80 processes the response
Use Case Ends.

Posting Device Data. This use case describes the posting of data from a handheld unit 16 to the GCNS 74 for processing.
Use Case Begins.
1. The user enters an activity response and presses the Enter button on the handheld unit 16.
2. The Responder 89 constructs a service request for the current activity.
3. The Responder 89 constructs a datagram for the service request, fragmenting as needed.
4. The Responder 89 requests that the Device MAC (DMAC) 90 send the first datagram fragment.
5. The DMAC 90 places the datagram into a DATA Request and transmits the frame to the PAN coordinator.
6. Saturn Dish MAC (SDMAC) 64 receives data from handheld unit 16.
7. The SDMAC 64 posts the data to the Access Point object 70.
8. The Access Point object 70 requests that the GCNS 74 update the DeviceSession object 102 that corresponds to the handheld unit 16 of the data.
9. The GCNS 74 updates the DeviceSession object 102.
10. The Access Point object 70 looks for an existing ReceiveDatagram object managing the datagram assembly.
11. The Access Point object 70 cannot find one, and thus determines this is a new datagram transfer.
12. The Access Point object 70 creates a ReceiveDatagram object 92 to manage receiving and assembling the datagram fragments.
13. The ReceiveDatagram object 92 collects the data payload.
14. The ReceiveDatagram object 92 determines there are more fragments due.
15. The Responder 89 requests that the Device MAC (DMAC) 90 send the second datagram fragment.
16. The DMAC 90 places the datagram into a DATA Request and transmits the frame to the PAN coordinator.
17. The Saturn Dish MAC (SDMAC) 64 receives data from the handheld unit 16.
18. The SDMAC 64 posts data to the Access Point object 70.
19. The Access Point object 70 looks for an existing ReceiveDatagram object managing the datagram assembly.
20. The Access Point object 70 locates the ReceiveDatagram object 92, and determines that this is a datagram fragment for an existing transfer.
21. The Access Point object 70 posts the datagram fragment to the ReceiveDatagram object 92.
22. The ReceiveDatagram object 92 determines there are no more fragments due.
23. The ReceiveDatagram object 92 posts the completed datagram to the GCNS 74 for processing.
24. The ReceiveDatagram object 92 terminates itself.
Use Case Ends.

Processing Device Data. This use case describes the steps to process datagrams posted to GCNS 74. This processing involves delivering the payload of the datagram to a service handler (e.g., an application program).
Use Case Begins.
1. The GCNS 74 examines the Service field of the datagram header.
2. The GCNS 74 determines that the Service field is "Wasabi".
3. The GCNS 74 posts the datagram to the Routing & Translation Program 78.
4. The Routing & Translation Program 78 processes the datagram.
5. The Routing & Translation Program 78 extracts the datagram payload.
6. The Routing & Translation Program 78 determines the payload carries a service request.
7. The Routing & Translation Program 78 extracts the URL of the service request.
8. The Routing & Translation Program 78 determines the URL is valid.
9. The Routing & Translation Program 78 determines the service to invoke.
10. The Routing & Translation Program 78 creates a GetLiveActivity object 96 to handle processing.
11. The GetLiveActivity object 96 translates the device payload to the appropriate HTTP request to send to the registered Wasabi application service handler which, in this example, is the application program 80.
12. The GetLiveActivity object 96 posts the request to the socket connection 85A of the application program 80.
13. The application program 80 receives the request.
14. The GetLiveActivity object 96 terminates itself.
15. The application program 80 processes the request
Use Case Ends.

Posting Service Handler Response or Request. This use case describes the steps to post a service response or request from an application program to the GCNS 74.
Use Case Begins.
1. A request/response is received by the Routing & Translation Program 78 via the ServerSocket object 84.
2. The Routing & Translation Program 78 determines the device address from the Device-Address header.
3. The Routing & Translation Program 78 instantiates the SendDatagram object 94 to send the data to the handheld unit 16.
4. The SendDatagram object 94 processes the request/response.
5. The SendDatagram object 94 constructs a datagram fragment.
6. The SendDatagram object 94 locates the Access Point object that the handheld unit 16 is associated with (e.g., the Access Point object 70).
7. The SendDatagram object 94 posts the datagram fragment to the Access Point object 70.
8. The SendDatagram object 94 constructs and posts more fragments as needed to the Access Point object 70.
9. The SendDatagram object 94 terminates.
Use Case Ends.

Processing Service Handler Response or Request. This use case describes the steps to process SendData requests posted to a Saturn Access Point (AP).

Use Case Begins.
1. The Access Point object 70 checks for pending send tasks.
2. The Access Point object 70 selects a SendData request for the handheld unit 16.
3. The Access Point object 70 posts a Data request to Saturn Dish MAC (SDMAC) 64.
4. The SDMAC 64 holds on to the data for an indirect send.
5. The Access Point object 70 checks for pending send data requests.
6. The Access Point object 70 selects a SendData request for the handheld unit 16.
7. The Access Point object 70 posts a Data request to the SDMAC 64.
8. The SDMAC 64 determines there is no room for another transaction.
9. The SDMAC 64 posts a DataConfirm response to the Access Point object 70 with status of TRANSACTION_OVERFLOW.
10. The Access Point object 70 checks for received data from the SDMAC 64.
11. The Access Point object 70 processes the DataConfirm received from the SDMAC 64.
12. The Access Point object 70 extracts msduHandle from DataConfirm.
13. The Access Point object 70 locates a SendData request that references msduHandle.
14. The Access Point object 70 posts the DataConfirm to the SendDatagram object 94 that posted the SendData request.
15. The SendDatagram object 94 determines if it should retry the request.
16. The SendDatagram object 94 requests that the Access Point object 70 retry the SendData request.
17. The Access Point object 70 posts a Data request to the SDMAC 64.
18. The SDMAC 64 sends data to the handheld unit 64.
19. The SDMAC 64 posts a DataConfirm response to the Access Point object 70 with a status of SUCCESS.
20. The Access Point object 70 processes the DataConfirm received from the SDMAC 64.
21. The Access Point object 70 extracts msduHandle from the DataConfirm.
22. The Access Point object 70 locates the SendData request that references msduHandle.
23. The Access Point object 70 posts the DataConfirm to the SendDatagram object 94 that posted the SendData request.
24. The SendDatagram object 94 determines all fragments have been sent successfully.
25. The SendDatagram object 94 terminates
Use Case Ends.

Security Violation. This use case describes the steps taken when a device service request does not meet the security requirements of the server.
Use Case Begins.
1. The SDMAC 64 posts data to the Access Point object 70.
2. The Access Point object 70 processes data.
3. The Access Point object 70 attempts to decrypt the data using the network's private key.
4. The Access Point object 70 determines the data security is not valid.
5. The Access Point object 70 rejects the data.
6. The Access Point object 70 requests that the GCNS 74 update the device session for the sender of the data with a security violation.
7. The GCNS 74 updates the device session security violation count.
8. The GCNS 74 logs the security violation.
9. The GCNS 74 checks for the upper limit permitted for security violations.
10. The GCNS 74 determines that the handheld unit 16 has exceeded max security violations.
11. The GCNS 74 instantiates a Disassociate object 104 for device.
12. GCNS posts the Disassociate object 104 to the Access Point object 70. (See Coordinator Disassociate use case for disassociation details.)
Use Case Ends.

In one embodiment of the invention, the DeviceSession is on a watch list for disassociating the device after exceeding the maximum number of permitted security violations. This way, the system 10 can refuse associations for some period of time while the session is aged out. The delay helps fight devices that try brute force attacks on guessing the encryption key in use. Furthermore, the age-out time period may be increased depending on how many times the system 10 detects that this device has committed a security violation.

Shutdown. This use case describes the steps taken when the Saturn Server is shutdown in an orderly fashion.
Use Case Begins.
1. The Saturn Server 82 sets state to "Stop".
2. The Saturn Server stops the ServerSocket 84 from accepting new requests for application services.
3. The Saturn Server 82 stops all Access Point objects 70 from accepting new requests from handheld units 16.
4. The GCNS 74 stops approving Association requests.
5. The Saturn Server 82 waits for all outstanding requests from devices and applications to complete.
6. The Saturn Server 82 determines all outstanding requests are completed.
7. The Saturn Server 82 sets its state to "Shutdown".
8. The Access Point object 70 stops accepting all requests from devices.
9. The ServerSocket 84 stops accepting all requests from existing socket connections.
10. The Saturn Server 82 requests that the Access Point Manger (APM) 68 shutdown all Access Point objects 70.
11. The APM 68 requests all Access Point objects 70 to Shutdown.
12. The Saturn Server 82 requests the Ground Control Server 76 to Shutdown.
13. The Saturn Server 82 requests that the ServerSocket 84 close all existing socket connections.
14. The Access Point objects 70 post Shutdown requests to the Saturn Dish MAC (SDMAC) 64.
15. The SDMAC 64 stops 802.15.4 network.
16. The Saturn Server 82 checks that all the Access Point objects 70 are stopped.
17. The Saturn Server 82 is shutdown.
Use Case Ends.

PAN ID Conflict Handling. This use case describes the steps to handle a PAN ID conflict. In this use case, the APMAC detects the conflict after receiving a beacon with a PAN ID equal to its own, but from a different source address. PAN ID conflicts can also be reported by a handheld unit.
Use Case Begins.
1. The Saturn Dish MAC (SDMAC) 64 posts a PAN ID Conflict command to the Access Point object 70.
2. The Access Point object 70 process PAN ID Conflict command.

3. The Access Point object 70 posts an ActiveScan request to the SDMAC 64.
4. The SDMAC 64 performs Active Scan.
5. The SDMAC posts ActiveScan response to the Access Point object 70.
6. The Access Point object 70 processes scan results and selects a random, unique PAN ID.
7. The Access Point object 70 posts a Coordinator Realignment command to the SDMAC 64.
8. The SDMAC 64 transmits Coordinator Realignment command.
9. The SDMAC 64 sets the PAN ID to the new PAN ID.
Use Case Ends.

It can be seen from the foregoing that a new and useful wireless classroom response system has been described. It should be noted that the use of the terms "a" and "an" and "the" and similar referents in the context of describing the invention (especially in the context of the following claims) are to be construed to cover both the singular and the plural, unless otherwise indicated herein or clearly contradicted by context. It should also be noted that recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. Preferred embodiments of this invention are described herein, including the best mode known to the inventors for carrying out the invention. It should be understood that the illustrated embodiments are exemplary only, and should not be taken as limiting the scope of the invention.

What is claimed is:

1. A wireless classroom response system comprising:
  a plurality of wireless networks, each of the plurality of wireless networks serving a different classroom of a plurality of classrooms, each of the plurality of wireless networks comprising:
    a computer located proximate to the classroom that the wireless network serves, wherein the computer executes a communications server and an application program, wherein the application program facilitates classroom activities;
    a wireless access point located proximate to the classroom that the wireless network serves, wherein the wireless access point is communicatively linked to the computer;
  and, a plurality of handheld units, each of which performs steps comprising:
    displaying, to a user, a list of the plurality of networks;
    receiving an input from the user that indicates which one of the wireless networks the handheld unit should connect to;
    connecting to the chosen wireless network, thereby becoming a node in the wireless network; and
    transmitting data to the application program via the wireless access point and the communications server.

2. The system of claim 1, wherein the communications server executes a program that fragments datagrams that are to be sent out to a handheld unit of the plurality of handheld units and assembles datagrams that are received from the handheld unit of the plurality of handheld units.

3. The system of claim 1, wherein when the application program is one of a plurality of application programs and when the communications server receives the transmitted data, it determines, based on the content of the data, which of the plurality of application programs to pass the data to.

4. The system of claim 1, wherein each of the plurality of wireless networks is a personal area network, and the wireless access point in each of the wireless networks acts as the coordinator for that network.

5. The system of claim 1, wherein the computer executes a translation program that receives messages from the plurality of handheld units formatted in a compact markup language, converts them into a standard markup language format, and provides them to the application program.

6. The system of claim 1, wherein the application program is one of a plurality of application programs and when the communications server receives the transmitted data, it determines, based on the type of handheld unit from which the message is received, which of the plurality of application programs to pass the data to.

7. A wireless classroom response system comprising:
  a computer located proximate to a classroom, wherein the computer displays a user interface that permits an instructor to interact with the computer, and wherein the computer executes a communications server;
  a wireless access point located proximate to the classroom and communicatively linked to the computer; and
  a plurality of handheld units deployed proximate to the classroom, with each handheld unit of the plurality being used by a student,
  wherein each of the plurality of handheld units performs steps comprising:
    transmitting a markup language document to the computer via the wireless access point, wherein the markup language data contains data that identifies a service of the communications server;
  and wherein the communications server performs the identified service.

8. The system of claim 7, wherein:
  the computer executes a plurality of application programs,
  an application program of the plurality of application programs is not able to interpret the markup language, and
  the computer executes a translation program that converts the markup language into a form that the application program can interpret.

9. The system of claim 8, wherein the identified service establishes the owner of the handheld device that transmitted the markup language document.

10. The system of claim 7, wherein the identified service establishes the owner of the handheld device that transmitted the markup language document.

11. The system of claim 7, wherein the identified service updates firmware on the handheld device.

12. The system of claim 7, wherein the computer executes an application program that sends a markup language document to the communications server, wherein the markup language contains a request for a service, wherein the communications server performs the requested service for the application program.

13. The system of claim 12, wherein the requested service comprises sending data to the handheld unit that sent the markup language document.

14. The system of claim 12, wherein the requested service comprises providing the identities of each of the plurality of handheld units to the application program.

15. A wireless classroom response system comprising:
- a computer located proximate to a classroom, wherein the computer displays a user interface that permits an instructor to interact with the computer, and wherein the computer executes a communications server;
- a wireless access point located proximate to the classroom and communicatively linked to the computer; and
- a plurality of handheld units deployed proximate to the classroom, with each handheld unit of the plurality being used by a student,
- wherein each of the plurality of handheld units performs steps comprising:
    - transmitting a message to the computer via the wireless access point, wherein the message is encoded in an open network protocol and identifies a service to be performed by the communications server;
- and wherein the communications server performs the identified service for the handheld device that transmitted the message.

16. The system of claim 15, wherein the wireless network is one of a plurality of wireless networks, and wherein a handheld unit of the plurality of handheld units performs steps comprising:
- stepping through logical wireless channels to locate a wireless network of the plurality, and
- receiving a beacon response from the wireless access point of the located wireless network.

17. The system of claim 15, wherein the wireless network is one of a plurality of wireless networks, and wherein a handheld unit of the plurality of handheld units performs steps comprising:
- scanning to identify which of the plurality of wireless networks is available, and
- connecting to a wireless network that, based on the scanning step, is identified to be available.

18. The system of claim 15, wherein a handheld unit of the plurality of handheld units performs steps comprising:
- transmitting a datagram to the computer via the wireless network, the datagram comprising data identifying the program from a plurality of programs executing on the computer.

19. The system of claim 15, wherein a handheld unit of the plurality of handheld units performs steps comprising:
- creating a datagram segment comprising version data, header length data, and service port data, wherein the service port data uniquely identifies the program, and
- transmitting the datagram to the computer via the wireless network.

20. The system of claim 15, wherein the open network protocol complies with the IEEE 802.15.4 standard.

* * * * *